(12) United States Patent
Mitlin et al.

(10) Patent No.: US 10,680,300 B2
(45) Date of Patent: Jun. 9, 2020

(54) SUPERCAPATTERY EMPLOYING CARBON NANOSHEETS IN THE ELECTRODES

(71) Applicant: David Mitlin, Hannawa Falls, NY (US)

(72) Inventors: David Mitlin, Hannawa Falls, NY (US); Huanlei Wang, Edmonton (CA)

(73) Assignee: Sparkle Power LLC, Rochester, NY (US)

( * ) Notice: Subject to any disclaimer, the term of this patent is extended or adjusted under 35 U.S.C. 154(b) by 346 days.

(21) Appl. No.: 15/269,241

(22) Filed: Sep. 19, 2016

(65) Prior Publication Data

US 2018/0083331 A1    Mar. 22, 2018

(51) Int. Cl.
*H01M 12/00* (2006.01)
*H01M 4/583* (2010.01)
*H01G 11/36* (2013.01)
*H01G 11/26* (2013.01)
*H01G 11/74* (2013.01)
(Continued)

(52) U.S. Cl.
CPC ........... *H01M 12/005* (2013.01); *C01B 32/15* (2017.08); *C01B 32/184* (2017.08); *C01B 32/318* (2017.08); *C01B 32/342* (2017.08); *H01G 11/24* (2013.01); *H01G 11/26* (2013.01); *H01G 11/36* (2013.01); *H01G 11/68* (2013.01); *H01G 11/70* (2013.01); *H01G 11/74* (2013.01); *H01G 11/78* (2013.01); *H01G 11/86* (2013.01); *H01M 4/583* (2013.01); *H01M 4/587* (2013.01); *C01P 2004/24* (2013.01); *C01P 2006/16* (2013.01);
(Continued)

(58) Field of Classification Search
CPC ...... H01M 12/00; H01M 12/005; H01M 4/04; H01M 4/0471; H01M 4/0404; H01M 4/133; H01M 4/06; H01M 4/583; H01M 4/66; H01M 4/662; H01G 11/36; H01G 11/26; H01G 11/34; H01G 11/74; H01G 11/78; H01G 11/86
See application file for complete search history.

(56) References Cited

U.S. PATENT DOCUMENTS 7,852,612 B2    12/2010  Zhao
2005/0078432 A1    4/2005  Gallay et al.
(Continued)

OTHER PUBLICATIONS

Huanlei Wang, et al., "Effect of surface modification on high-surface-area carbon nanosheets anode in sodium ion battery", Microporous and Mesoporous Materials 227 (2016) 1-8.
Dario Borghino, "Hemp-derived carbon nanosheets help build cheap, high-performance supercapacitors", American Chemical Society, Aug. 20, 2014, 3 pages.
Huanlei Wang, et al., "Hybrid Device Employing Three-Dimensional Arrays of MnO in Carbon Nanosheets Bridges Battery-Supercapacitor Divide", © 2014 American Chemical Society, Nano Lett. 2014, 14, 1987-1994.
(Continued)

*Primary Examiner* — Karie O'Neill Apicella
(74) *Attorney, Agent, or Firm* — Murtha Cullina LLP

(57) ABSTRACT

Carbon nanosheets fabricated by carbonization and activation or by carbonization alone. The nanosheets possess a disordered structure for copious reversible binding of ions at the carbon defects. They are also hierarchically micro-meso-macro porous, allowing facile ion transport at high rates both through the pore-filling electrolyte and in the solid-state. Also, a combined battery—supercapacitor energy storage device using the carbon nanosheets as one or both of the electrodes therein. Tuning the mass-loading ratio of the carbon nanosheets in the two electrodes configures the carbon nanosheets to operate either as a bulk insertion electrode (anode) or a surface adsorption electrode (cathode). The energy storage device may further include a housing with a form factor of a commercial battery.

31 Claims, 14 Drawing Sheets

(51) Int. Cl.
*H01G 11/78* (2013.01)
*H01G 11/86* (2013.01)
*H01M 4/587* (2010.01)
*C01B 32/15* (2017.01)
*C01B 32/342* (2017.01)
*C01B 32/318* (2017.01)
*H01G 11/70* (2013.01)
*C01B 32/184* (2017.01)
*H01G 11/68* (2013.01)
*H01G 11/24* (2013.01)
*H01M 4/02* (2006.01)
*H01G 11/06* (2013.01)

(52) U.S. Cl.
CPC ....... *H01G 11/06* (2013.01); *H01M 2004/021* (2013.01)

(56) References Cited

U.S. PATENT DOCUMENTS

| | | | |
|---|---|---|---|
| 2011/0179637 A1* | 7/2011 | Eberman | A61N 1/378 29/623.5 |
| 2012/0026643 A1* | 2/2012 | Yu | H01G 11/02 361/502 |
| 2014/0042390 A1* | 2/2014 | Gruner | H01M 4/364 257/14 |
| 2014/0291587 A1 | 10/2014 | Li et al. | |
| 2014/0328006 A1* | 11/2014 | Mitlin | H01G 11/36 361/502 |

OTHER PUBLICATIONS

Jia Ding, et al., "Peanut shell hybrid sodium ion capacitor with extreme energy-power rivals lithium ion capacitors", Energy Environ. Sci., 2015, 8, 941-955.

* cited by examiner

SUPERCAPATTERY EMPLOYING CARBON NANOSHEETS IN THE ELECTRODES

FIELD OF THE INVENTION

The present invention relates to an electrical energy storage system, and more particularly to a hybrid battery-and-capacitor system using carbon nanosheets in the electrodes.

BACKGROUND OF THE INVENTION

Primarily due to their high energy density, lithium ion batteries (LIBs) are currently the commercially dominant energy storage devices, and extensive effort has been made to design nanostructured electrodes. However, as lithium precursor supplies are both limited and confined to narrow geographies, technology based on alternative charge carriers is being sought. Thus room-temperature sodium ion batteries (NIBs, NABs, SIBs) have gained increasing attention due to the wide availability and low cost of Na.

Substantial success has been recently achieved in developing cathode and anode materials for conventional sodium ion batteries. It is well established that graphite will not intercalate Na to an appreciable extent, due to its larger ionic radius than Li (0.102 nm vs. 0.076 nm) and weaker chemical interaction with the graphene sheets. There has been a range of alternative NIB anode materials published recently in literature, including nitrogen doped carbons, non-graphite carbon nanostructures, nanostructured red phosphorous, ionic compounds, nitrides, and metal oxides, as well as a range of Na active metal alloys with combinations of active and inactive phases. Graphene and graphene nanocomposites have also been utilized, along with Na intercalating "MXenes" where M is a transition metal and X is C or N. Similar as for LIBs', appropriately designed carbons are perhaps the most economical and technically viable candidate for NIB applications. A range of hard ("hard" is defined as non-graphitizable) carbons has been employed, including N-doped carbons. Recently, soft carbons have also been employed with good success.

Another commercially important energy storage system is an electrochemical capacitor, a.k.a. a supercapacitor, which provides greater power density and longer cycling life than a secondary battery, but at the expense of substantially decreased energy density. The main development target for supercapacitors is to expand their energy density without sacrificing too significantly their high power and high cyclability. A popular approach for achieving such balance is to design a device with a capacitor-type positive electrode (cathode) and battery-type negative electrode (anode). In such a system, termed a hybrid ion capacitor among other names, charge is stored by bulk ion insertion into the anode, similar as in a standard battery. However the positive electrode stores charge primarily by reversible ion adsorption rather than ion intercalation, aiding the rate capability and reducing cycling-induced degradation.

While there have been a great variety hybrid lithium and sodium ion capacitor architectures, they have generally relied on dissimilar materials in the cathode versus the anode. An aim of the present invention is a symmetric electrode architecture which employs similar or same materials in the cathode versus the anode.

Another aim in both battery and supercapacitor fields is to design high performance electrodes through green methods and from sustainable precursors, such as those derived from waste streams.

SUMMARY OF THE INVENTION

In one aspect of the present invention, performance that is state-of-the-art for the combined battery and supercapacitor devices is achieved using an identical nanostructured carbon (also called carbon nanosheets, or CNS) in both electrodes. By tuning the mass-loading ratio in the two electrodes, the carbon nanosheets were designed to operate either as a bulk insertion electrode (anode) or a surface adsorption electrode (cathode). Further, in another aspect, the carbon nanosheets are prepared through green methods by employing a biomass waste. However, as is apparent to those of skill in the art, the invention is not limited to the two aspects.

In one aspect, the present invention provides carbon nanosheets suitable for using as an electrode which comprise, on a nanometer scale, at least one amorphous site, at least one crystalline site, or a combination thereof. The overall structure of the carbon nanosheets is highly disordered. The carbon nanosheets are able to reversibly store ions (e.g., lithium ions, sodium ions, potassium ions, magnesium ions) by reversible adsorption at the disordered amorphous site.

Each of the carbon nanosheets may not be connected to another nanosheet and may have an inconsistent thickness across the cross section of each nanosheet. The carbon nanosheets have a high mesoporosity and may have nanometer scale troughs on their surfaces. Although the carbon nanosheets may comprise graphene planes, the graphene planes are ordered. Moreover, the graphene planes may have defects in one or more graphene planes. In some embodiments, there are no graphene domains and/or no equilibrium graphite in the carbon nanosheets. In other embodiments there are crystallites of graphite and/or fullerene structures present in and/or on the carbon nanosheets. In another embodiment there is amorphous carbon and/or carbon black in and/or on the carbon nanosheets.

Another structure feature of the carbon nanosheets is that they have highly enriched O, N, or other heteroatoms on the structural surfaces. The carbon nanosheets may also comprise at least one component selecting from the group consisting of ion oxides, sulfides, selenides, nitrides, oxynitrides, phosphides, boride, and a combination thereof, which are disposed on the surfaces of and/or embedded inside the carbon nanosheets. The carbon nanosheets may further comprise a plurality of Sn, Sb, Si, Ge, alloys of Sn, Sb, Si, and Ge, secondary metallic, metalloid, and/or semiconductor additions are disposed on the surfaces of and/or embedded inside the carbon nanosheets.

In yet another aspect, the present invention provides a method of preparing the carbon nanosheets of the present invention by pyrolysis carbonization of a natural biological precursor or a synthetic precursor. Of particular interest is the carbonization of a biomass waste precursor. Biobimass waste provides a cheap and sustainable supply of the precursor. It also allows for a green method synthesis. To obtain the above mentioned nanometer-scale structure features, in some embodiments, the process does not involve a hydrothermal treatment of the precursor. The carbonized product from pyrolysis may further be activated by treating with a base, followed by an acid wash and an aqueous wash, before final drying.

In yet another aspect, the present invention provides a combined battery—supercapacitor energy storage device which employs the highly disordered carbon nanosheets described above in both electrodes, as primary phases, secondary phases, or supporting materials.

The energy storage device may simultaneously use multiple active ions (e.g. lithium and sodium ions used simultaneously) as electrolytes. By incorporating the highly disordered carbon nanosheets, the energy storage device is configured to reversibly store ions at the disordered sites of the carbon nanosheets.

In yet another aspect, the present invention provides another battery—supercapacitor type energy storage device (also called batpacitor) which employs the highly disordered carbon nanosheets described above as an anode, an cathode, or both. When the carbon nanosheets are employed as both the anode and the cathode, a mass ratio of 1:1 to 1:4 is provided to control the two carbon nanosheets to function as an anode and a cathode respectively.

In a further aspect, the present invention provides an energy storage device having the batpacitor as described above and a housing with dimensions that conform to standardized battery dimensions. The batpacitor is disposed in the housing and electrically coupled to the housing. The housing comprises a form factor of a D-cell sized battery, a C-cell sized battery, an AA-cell sized battery, an AAA-cell sized battery, an 18650 lithium ion battery, or a 26650 lithium ion battery. Inside the batpacitor, the anode and the cathode may be disposed on two opposite surfaces of an elongated insulator, which are then wound in a jelly roll configuration.

DETAILED DESCRIPTION OF THE INVENTION

In one aspect, the present invention provides carbon nanosheets comprising an amorphous site, a crystalline site, or a combination of the two. Unlike the state-of-art carbon nanosheets which possess a relatively ordered and uniformed nanometer-scale structure, the overall nanometer-scale structure of the carbon nanosheets of the present invention is highly disordered. The disordered structure makes the nanosheets particularly suitable for hybrid capacitor applications, where fast and reversible adsorption at disordered sites is the targeted charge storage mechanism.

According to one embodiment, such highly disordered carbon nanosheets may be obtained by pyrolysis carbonization of peanut skins with a catalyst FeCl$_3$ at a temperature of 800° C. (a relatively low carbonization temperature). The obtained peanut Skin derived Carbon Nanosheets are labeled as SCN. The SCN may further be activated by physically mixing with potassium hydroxide (KOH) followed by washing and drying. The KOH activated carbons are labeled as SCN-A where A denotes activation. SCN and SCN-A have been studies for their structures, properties, and uses in electrodes. The present invention will be described in detail below, using SCN and SCN-A as examples, when applicable.

Figure 1:
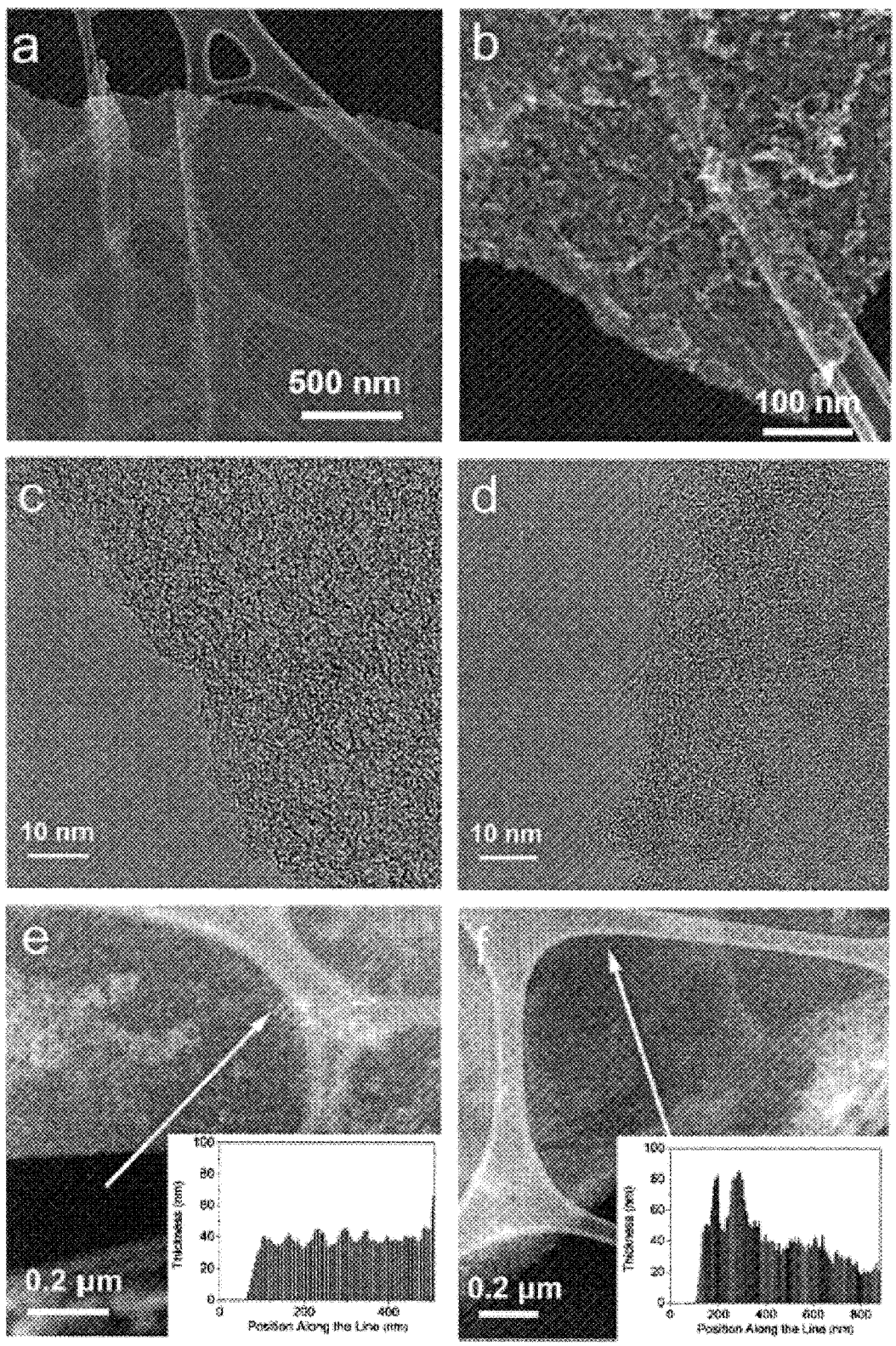
FIG. 1 shows SEM and TEM micrographs of SCN (a, c, e) and SCN-A (b, d, f) according to one embodiment of the present invention: (a, b) high-magnification of SEM images; (c, d) high resolution TEM images; (e, f) annual dark field (ADF) TEM micrographs and EELS thickness profiles (inset).

The carbon nanosheets of the present invention have a macroscopically sheet-like structure, as shown in the scanning electron microscopy (SEM) images of SCN and SCN-A in FIGS. 1a and 1b. The carbon nanosheets have no or essentially no ordered graphene planes in the carbon nanosheets, either single or layered. Moreover, the carbon nanosheets contain no defect-free graphene planes, either single or layered. For example, the structural defects may exist in a typical graphene form of a two-dimensional, atomic-scale, honey-comb lattice so as to disrupt the consistency and uniformity of the lattice. The carbon nanosheets also contain no graphene domain. The high-resolution transmission electron microscopy (TEM) micrographs shown in FIGS. 1c and 1d highlight a low degree of graphene ordering in the structures of SCN and SCN-A.

Due to the unordered graphene planes and the graphene defects, metal ions can only engage with the carbon nanosheets temporarily and reversibly by reversible intercalation between the graphene planes and by reversible adsorption at the graphene defects. The metal ions include ions commonly used in hybrid capacitor applications, such as lithium ions, sodium ions, potassium ions, magnesium ions, etc. As stated before, this type of defected and disordered structure is actually quite advantageous for hybrid capacitor applications.

Each carbon nanosheet may be fully graphitic, partially graphitic, non-graphitic, or amorphous. Graphite is by definition a plate, versus a curved, ruffled, ridged, or locally bent structure. A single carbon nanosheet may be disconnected from others and may have inconsistent thickness across its cross section. The largest thickness of a single nanosheet may be at least two times of the smallest thickness of the same nanosheet. The thickness profile of one nanosheet also varies from that of another nanosheet. In some embodiments, a single carbon nanosheet has a thickness (e.g., average thickness) of greater than 4 nm. In other embodiments, a single carbon nanosheet has an average thickness of about 20 nm. In further embodiments, a single carbon nanosheet has a thickness of greater than about 20 nm. FIGS. 1e and 1f show electron energy loss spectroscopy (EELS) thickness analysis inserts, which give a sheet thickness being about 20 nm. Overall there appears to be more variability in the sheet thickness in the KOH+$FeCl_3$ versus $FeCl_3$ activated materials (i.e., SCN-A versus SCN), which would be due to the more anisotropic etching by KOH.

A total thickness of the carbon nanosheets may be from 4 nm to about 1,000 nm. In some embodiments, the carbon nanosheets may have more than 11 graphene layers. In other embodiments, the carbon nanosheets may have less than 11 graphene layers.

Figure 2:
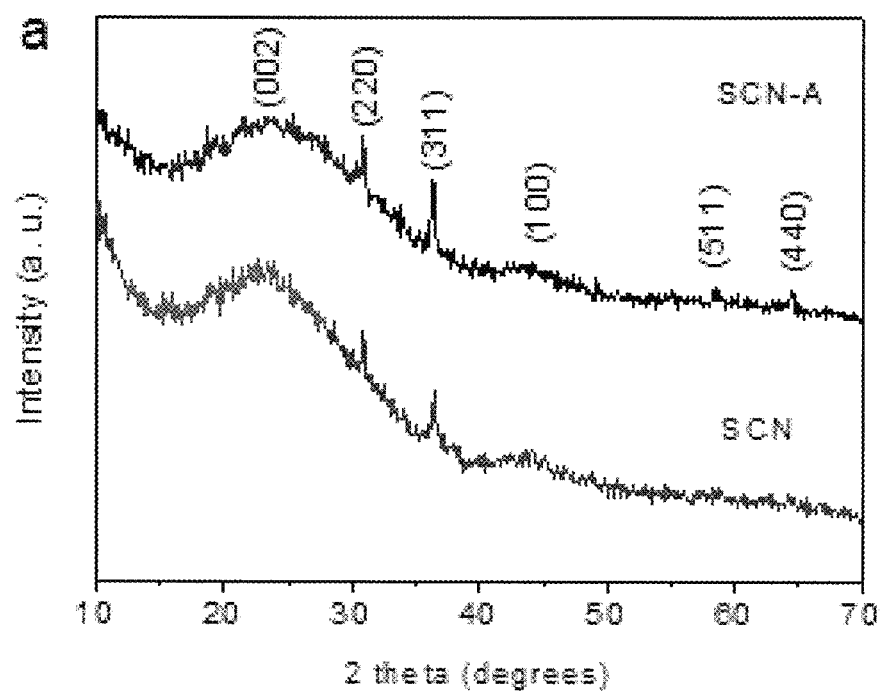
FIG. 2 shows power XRD patterns of SCN and SCN-A according to some embodiments of the present invention.

FIG. 2 illustrates structures of SCN and SCN-A from an X-ray diffraction (XRD) study. There are two broad peaks at 2θ=23.4/24.1° and 44.2/43.7°, corresponding to the (002) and (100) Bragg reflections, indicating that SCN and SCN-A are only partially ordered carbons. An average graphene interlayer spacing is calculated from the (002) peak centers, yielding a value of 0.37 nm for SCN and 0.38 nm for SCN-A, which are 10% and 13% dilated relative to an equilibrium graphite spacing of 0.335 nm. Thus, the spacings between the graphene layers allow a high level of reversible ion (e.g., Na, Li, K, Mg, etc.) intercalation into the structure. The thickness of the graphitic domains is calculated based on the well-known Scherrer equation, using the full width at half-maximum value of the (002) peak. The domains are calculated to be to be 0.82-0.83 nm thick. Therefore, the SCN and SCN-A are composed of 2-3 (e.g. 0.83/0.37=2.2) layer-stacked graphene sheets.

Figure 3:
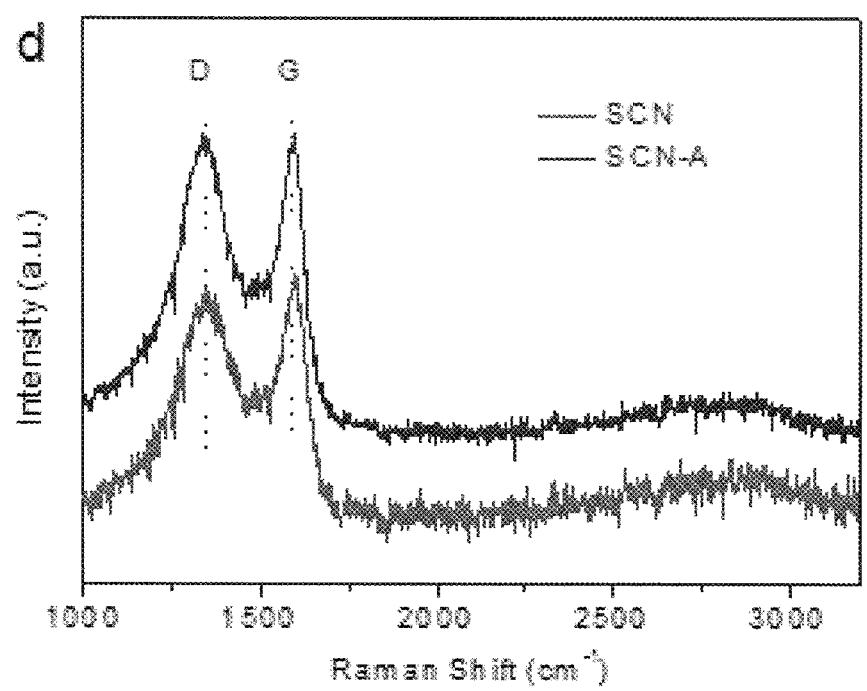
FIG. 3 shows Roman spectra of SCN and SCN-A according to some embodiments of the present invention.

FIG. 3 illustrates structures of SCN and SCN-A by Raman spectroscopy. A D-band corresponding to the disordered and defective portions of the carbon is at ~1350 $cm^{-1}$, and a G-band corresponding to the graphitic portions of the carbon is at ~1590 $cm^{-1}$. The integral intensity ratio of G-band to D-band ($I_G/I_D$) is calculated and displayed is Table 1.

TABLE 1

Physical parameters for SCN and SCN-A.

| Samples | $I_G/I_D$ | $S_{BET}$ ($m^2$ $g^{-1}$)[a] | $S_{DFT}$ ($m^2$ $g^{-1}$)[b] | $V_t$ ($cm^3$ $g^{-1}$)[c] | Pore volume in $cm^3$ $g^{-1}$ [d] and (pore volume percentage (%)) | | |
|---|---|---|---|---|---|---|---|
| | | | | | $V_{<1\ nm}$ | $V_{1-2\ nm}$ | $V_{>2\ nm}$ |
| SCN | 0.40 | 1821 | 1497 | 1.94 | 0.25(18.2) | 0.35(25.5) | 0.77(57.3) |
| SCN-A | 0.33 | 2070 | 1396 | 2.65 | 0.13(6.8) | 0.36(18.8) | 1.43(74.4) |

[a] BET surface area was calculated in the pressure range of 0.05 to 0.20.
[b] Calculated with DFT method.
[c] The total pore volume was determined at a relative pressure of 0.98.
[d] The volume of pores smaller than 1 nm ($V_{<1\ nm}$), pores between 1 and 2 nm ($V_{1-2\ nm}$), and pores larger than 2 nm ($V_{>2\ nm}$) was generated by DFT analysis.

The value of $I_G/I_D$ indicates the degree of graphitic ordering in the carbons. Here, the value of $I_G/I_D$ for SCN (0.40) is higher than that of commercial activated carbon (0.26), indicating somewhat more ordering in the SCN sample. The $I_G/I_D$ value is decreased to 0.33 for the SCN-A specimen, indicating that liquid potassium (i.e., KOH) attacks a proportionally higher fraction of the more ordered portions of the carbon during preparation, as compared to $FeCl_3$ alone. It is not expected that carbons derived from peanut skins would be highly ordered, especially at the relatively low pyrolysis temperatures employed here. The lack of sharp and strong peaks in the spectral range 2400-3300 $cm^{-1}$ confirm the lack of equilibrium graphite, as expected from the low temperature of the pyrolysis process and the intrinsic "hard-carbon" structure of the precursor (e.g., peanut skin). It is well known that carbon may have several allotropes, e.g., graphite, charcoal, and diamond. By the term equilibrium graphite used herein, it refers to a crystalline allotrope of carbon, which is not a diamond.

One novel feature of the carbon nanosheets is that they are oxygen enriched. In some embodiments, there are 10 wt % of more oxygen, deposited on the surfaces of and embedded inside the nanosheets. As such, the carbon nanosheets may conveniently and reversibly store ions (Li, Na, K, and/or Mg) by reversible binding at the O moieties.

The carbon nanosheets are hierarchically micro-meso-macro porous, allowing facile ion transport at high rates both through the pore-filling electrolyte and in the solid-state. They comprise a microporosity of a pore size in a range of 0.1 nm to 2 nm, a mesoporosity of a pore size in a range of 2 nm to 50 nm, and a macroporosity of a pore size in a range of 50 nm to 1 mm. Preferably, the carbon nanosheets mainly contain micropores (<2 nm) and mesopores (2-10 nm). More preferably, the carbon nanosheets contain over 50% of all mesopores.

Figure 4:
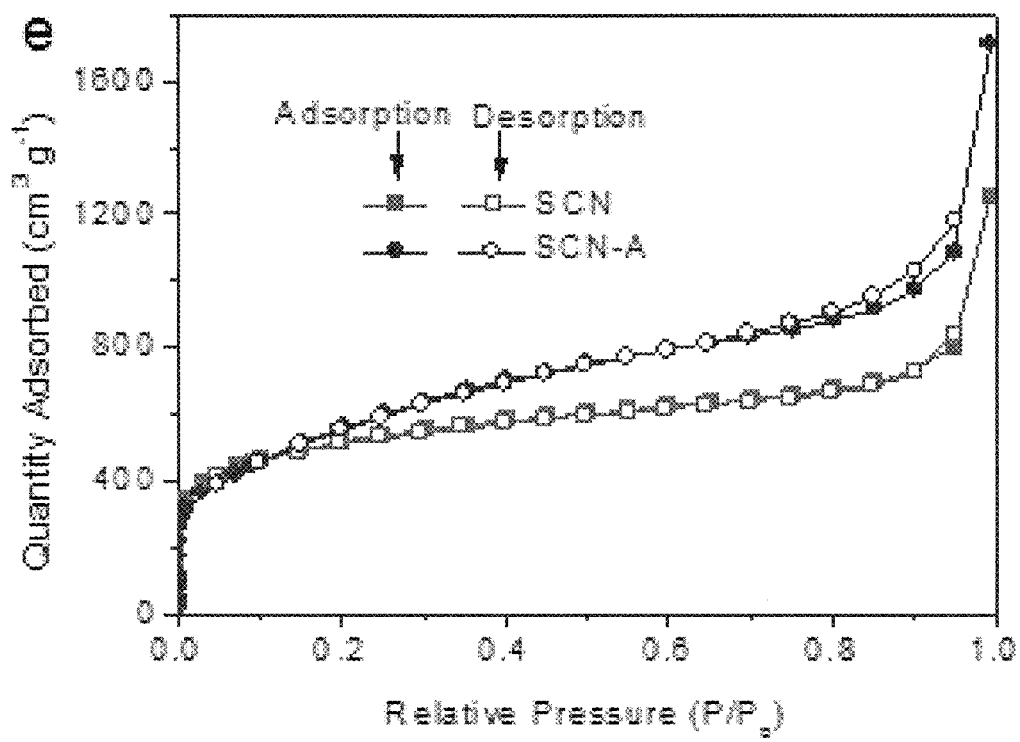
FIG. 4 shows nitrogen adsorption and desorption isotherms of SCN and SCN-A according to some embodiments of the present invention.

FIG. 4 illustrates nitrogen adsorption isotherms of SCN and SCN-A. Table 1 shows the textural parameters derived from the isotherms of FIG. 4. Collectively, FIG. 4 and Table 1 report that the total Brunauer-Emmett-Teller (BET) specific surface area and total pore volume of SCN are 1821 $m^2$ $g^{-1}$ and 1.94 $cm^3$ $g^{-1}$; and that the surface area and pore volume of SCN-A is higher, at 2070 $m^2$ $g^{-1}$ and 2.65 $cm^3$ $g^{-1}$.

Figure 5:
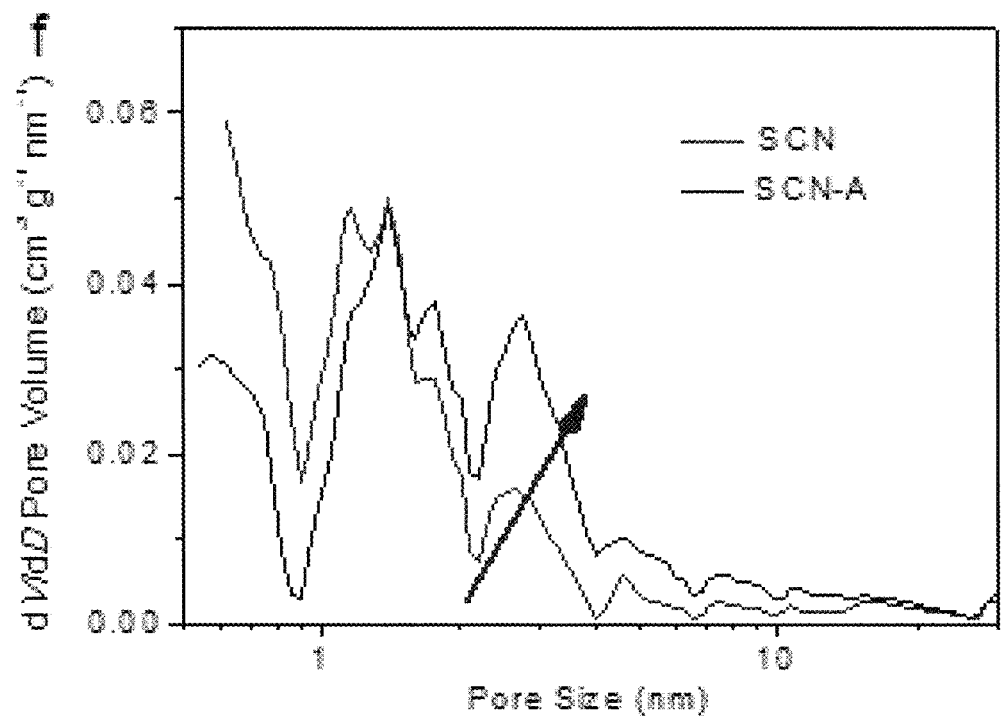
FIG. 5 shows related port size distributions of SCN and SCN-A according to some embodiments of the present invention, as calculated by DFT.

FIG. 5 shows pore size distributions of SCN and SCN-A obtained by density functional theory (DFT) calculations. SCN mainly contains micropores (<2 nm) and mesopores (2-10 nm). In preferred embodiments, the overall mesoporosity may be over 50% of all pore volumes. Without wishing to be bound by theory, it is believe that the $FeCl_3$ is important for in-situ activation since the Fe catalyzes the conversion of C to CO and $CO_2$, resulting in carbons with high surface area and high porosity. The addition of KOH also leads to the noticeable increase in the volume of small mesopores of SCN-A in the range of 2-4 nm.

The carbon nanosheets may additionally comprise nanometer scale surface troughs for electrolyte storage, as shown in FIGS. 1e and 1f.

As will be appreciated by a person of ordinary skill in the art, the high surface area, plentiful pores and excellent pore size distribution, and surface troughs of SCN and SCN-A provide tremendous active surface area for ion adsorption combined with wide and interconnected electrolyte-filled pathways for fast ion diffusion. Thus, the carbon nanosheets of the present invention afford excellent rate capability and power characteristics from the material. Moreover, the morphology, porosity, and the pore size distribution of the carbon nanosheets also make them an ideal candidate to capture carbon dioxide ($CO_2$) which may be produced during the operation of the energy storage device or otherwise exist in the energy storage device.

In some embodiments, the carbon nanosheets may comprise $Fe_3O_4$, $Fe_2O_3$ or other metal oxide. FIG. 2 shows diffraction peaks of $Fe_3O_4$, i.e., (220), (311), (511) and (440). The amount of $Fe_3O_4$ is 12-16 wt %, as calculated by a thermal gravimetric (TG) analysis. The iron (Fe) species may be initially hydrolyzed to hydroxides, and then reduced to $Fe_3O_4$ by the reducing gas (e.g. $H_2$, CO) or the formed carbon. Any free Fe nanoparticles would also nearly instantaneously oxidize when exposed to ambient. The incomplete removal of the metal components is attributed the material being deeply imbedded in the carbon and thus not accessible by hydrochloric acid. Thus, the nanosheets employ a three-dimensional array of iron oxides. $Fe_3O_4$ and $Fe_2O_3$ are ion active, meaning that $Fe_3O_4$, $Fe_2O_3$ or other metal oxide can reversibly store ions (e.g., Na, Li, K, Mg, etc.) due to a partially reversible conversion reaction with the ions. In other to iron oxides, other metal oxides (e.g., Mn oxides and Co oxides) may be incorporated to provide the same functions.

In other embodiments, a plurality of nitrogen, sulfur, and/or other heteroatoms are disposed on surfaces of the carbon nanosheets. For example, based on a near surface chemical composition study of SCN and SCN-A by employing XPS, the SCN contains 2.46 at % nitrogen and 5.66 at % oxygen, and the activated sample SCN-A contains 2.04 at % nitrogen and 3.70 at % oxygen. The nitrogen/oxygen containing groups provide additional active sites and/or defects for ion storage.

In yet other embodiments, the carbon nanosheets comprise sulfides, selenides, nitrides, oxynitrides, phosphides, boride, and a combination thereof. In further embodiments, the carbon nanosheets comprise a plurality of Sn, Sb, Si, Ge, alloys of Sn, Sb, Si, and Ge, secondary metallic, metalloid, and/or semiconductor additions. All of these components may be embedded inside the nanosheets or presented on the surfaces of the nanosheets to provide a three-dimensional array of these components to facilitate the performances of the carbon nanosheets. The carbon nanosheets also have trace impurity levels when they are in bulk.

In another aspect, the present invention provides a method of preparing the carbon nanosheets described above. The method comprises carbonizing a precursor by pyrolysis to produce a carbonized product, followed by an optional activation step.

According to some embodiments, the carbonizing step is carried out in an oxygen free environment (e.g. under an argon) at a carbonization temperature (e.g. 800° C.) to obtain the carbons (also called carbon nanosheets). Preferably, the carbonizing step uses a catalyst. More preferably, the carbonizing step uses $FeCl_3$ as a catalyst. The use of a catalyst helps the pore formation and also lowers the synthesis (i.e., carbonization) temperature.

To activate a carbonized product, a base (e.g. KOH) is added to provide anisotropic etching of the carbonized product which further increases the mesoporosity level of the final carbons. The base activated product may further washed with an acid solution and with water, followed by drying to produce an activated carbonized nanosheets.

The carbonization is preferably conducted without involving a hydrothermal process. It is noticed that a hydrothermal process which uses a high temperature for carbonization does not yield the highly disordered, highly porous, and oxygen and hetero atom enriched carbon nanosheets of the present invention.

The precursor may be a natural biological precursor or a synthetic precursor. The synthetic precursor may be a polymer or a petroleum product. The natural biological precursor may be a plant precursor other than a cellulose. In some embodiments, the plant precursor is selected from a group consisting of hemp, jute, flax, keenaf, marijuana, ramie fiber, ramie hurd, a soybean hull, and a peanut skin. In other embodiments, the plant precursor is lignin, hemicellulose, pectin, starch, plant leaf, hurd, fiber, any portions of trees including roots, trunk, bark, leafs, twigs, branches, any portions of lumber products, peanut, peanut shells, peanut skins, or other legumes or their shells or skins.

One preferred precursor is peanut skin, which is a by-product of food processing including the making of peanut butter, de-shelled snack peanuts, and confectionaries. In all of these processes, peanut skin is separated from peanut (i.e. blanching) and is generally discarded or employed as compose. Because peanut skin is high in procyanidins, which impedes proper digestion of protein, it is not widely employed for animal feed. According to the US Department of Agriculture, the global production of peanut skin is on the 1 million tons per year. Thus, peanut skin is an ideal waste byproduct looking for a value-added application.

Peanut skin is a heterogeneous, non-lignin, composite containing approximately 12% protein, 16% fat, and 72% carbohydrates. The non-lignin phase make peanut skin a hard-carbon, difficult to graphitize or to form into a highly ordered structure. For some electrodes, such as sodium electrodes, graphite is undesirable, peanut skin is thus an ideal precursor, combining classic "green" bio-waste attributes with performance functionality. Moreover, the heterogeneity of peanut skin implies that it may be possible to selectively etch the structure during pyrolysis/activation and hence exfoliate the final product into nanosheets.

In yet another aspect, the present invention provides a combined battery—supercapacitor energy storage device (also called supercapattery or batpacitor) by using the disordered carbon nanosheets described previously. The nanosheets may be used in both electrodes, in anode, in cathode, as supporting material (i.e. secondary addition), or in any other component of the battery, supercapacitor, or batpacitor. The properties and specifications of the carbon nanosheets used in the energy storage device will be not be repeated.

Specifically, the carbon nanosheets may be used in a device employing standard or research-grade secondary or primary battery or supercapacitor or combination of thereof electrolytes, including ethylene carbonate (EC), diethyl carbonate (DEC), dimethyl carbonate (DMC), acetonitrile, propylene carbonate, tetrahydrofuran, ionic liquids, aqueous KOH, aqueous $H_2SO_4$, $Li_2SO_4$, $Na_2SO_4$, etc. The charge carrier may be ions of Li, Na, K, Ca, Mg, Al, H, OH, or any combination of these, such as ions of Na and Li. In some preferred embodiments, the energy storage device employs only ions in the electrolyte and/or metal source added to one or both electrodes.

According to some embodiments, the carbon nanosheets are used in both electrodes of the energy storage device as the primary phases. According to other embodiments, the carbon nanosheets are used in both electrodes as the secondary phase. According to further embodiments, the carbon nanosheets may be added to an anode or a cathode as a minority phase (by weight or volume) to improve performance of the anode or the cathode, e.g., boost conductivity, rate capability, capacity, cyclability, etc. of existing electrode materials.

In some embodiments, the carbon nanosheets used in the electrodes comprise ion active oxides (e.g., $Fe_3O_4$, $Fe_2O_3$, etc.) imbedded inside the carbon nanosheets so that the energy storage device may store ions by reversible reacting with the ion active oxides.

In some embodiments, a plurality of O, N, B, S, and/or P functional groups are disposed on the surfaces of the carbon nanosheets used in the electrodes so that the energy storage device may store ions by reversible ion adsorption at the O, N, B, S, and/or P functional groups.

In some preferred embodiments, the carbon nanosheets used in the electrodes have no ordered graphene planes and graphene planes have defects The carbon nanosheets further have at least 50% mesoporosity and nanometer surface troughs. The resulting energy storage device is able to reversibly store charge by reversible intercalation of ions between the graphene planes and by reversible ion adsorption at the graphene planes with defects, the mesopores, and the nanometer scale surface troughs.

In yet another aspect, the present invention provides another battery—supercapacitor type energy storage device which employs the highly disordered carbon nanosheets described above as an anode (in a half-cell), an cathode (in a half-cell), or both (in a full-cell). The properties and specifications of the carbon nanosheets used in the half-cell and full-cell will be not be repeated.

According to some embodiments, when the carbon nanosheets are employed as the anode, the cathode may be selected from a group consisting of a lithium iron phosphate (LFP), a nickel cobalt aluminum (NCA), a nickel manganese cobalt (NMC) cathode, a lithium cobalt oxide (LCO) cathode, and a ceramic positive electrode.

According to other embodiments, when the carbon nanosheets are employed as the cathode, the anode may be selected from a group consisting of an oxide-based anode, a lithiated Sn anode, a lithium metal anode, a sulfur-based anode, a selenium anode, a graphite anode, an activated carbon anode, a graphene anode, a Si anode, a Sn anode, an alloy anode, an oxides anode, a sulfides anode, a nitrides anode, or other negative electrode.

According to some embodiments, when the carbon nanosheets are employed as both the anode and the cathode, it is preferred that the carbon nanosheets used as the anode and those used as the cathode have substantial same or identical chemical component and structure. A mass ratio of the carbon nanosheets in the two electrodes are tuned so that the carbon nanosheets can operate either as a bulk insertion electrode (anode) or a surface adsorption electrode (cathode). For instance, the positive electrode could have a higher mass loading and hence operates at a high voltage, wherein ion surface adsorption is the primary charge storage mechanism, while the negative electrode could have a lower mass loading and hence operates at a lower voltage, wherein the primary charge storage mechanism is ion insertion into the bulk.

This means that the carbon nanosheet material has a propensity to operate by either bulk or surface charge storage. In other words, a high surface area carbon electrode that intercalates Na or Li or K, but also stores ion on the surface by reversible binding at O surface groups and at graphene defects. When employed as a negative electrode, the primary charge storage mechanism of the carbon nanosheet electrode is ion intercalation. When employed as a positive electrode, the primary charge storage mechanism of the carbon nanosheet electrode is reversible adsorption at O surface groups and/or graphene defects. In contrast, a conventional supercapacitor operates only by surface charge storage and a conventional battery operates by bulk charge storage.

Being able to construe a batpacitor which employs same or substantially same materials in the cathode and the anode, by merely adjusting the ratio of the nanosheets in the two electrodes, provides a great convenience in the electrode constructions. In preferred embodiments, the mass ratio of the carbon nanosheets as the anode verses as the cathode is from 1:1 to 1:4. Preferably, the mass ratio is 1:2 to 1:4. Even more preferably, the mass ratio is 1:4.

When employed as electrodes, the carbon nanosheets show a tremendous reversible (desodiation) capacity of up to 461 mAh $g^{-1}$ at 100 mA $g^{-1}$ and excellent rate capability, e.g. 107 mAh $g^{-1}$ at 5 A $g^{-1}$. An optimized ion capacitor device may display highly favorable Ragone chart placement, e.g. 112 and 45 Wh $kg^{-1}$ at 67 and 12000 W $kg^{-1}$, retaining 85% of its capacity after 3000 cycles. The electrochemical performances of the nanosheets as an anode only, as a cathode only, and as both anode and cathode will be discussed in details in the Experimental Section (IV to VI).

In a further aspect, the present invention provides an energy storage device having a housing conform to standardized battery dimensions to enclose the batpacitor described above. The batpacitor is disposed in the housing and electrically coupled to the housing. The housing may comprise a form factor of a D-cell sized battery, a C-cell sized battery, an AA-cell sized battery, an AAA-cell sized battery, a 18650 lithium ion battery, or a 26650 lithium ion battery, such that the energy storage device may take the form of a commercial battery.

The batpacitor may use the nanosheets as an only, as a cathode only, or as both anode and cathode only, as discussed previously. The anode and the cathode may be both in the form of an elongate piece, such that they may be disposed on two opposite surfaces of an elongated insulator. The positive electrode, the insulator, and the negative electrode are then wound in a jelly roll configuration and disposed in the batpacitor, as in a typical commercial battery configuration. U.S. Pat. No. 9,373,847 and U.S. Application No. 20050078432 disclose constructing batteries/capacitors which have a housing with a form factor. The teachings of the references are incorporated by reference in entirety.

EXPERIMENTAL SECTION

I. Material Synthesis

According to some embodiments, the carbon nanosheets for electrodes were prepared from carbonization followed by activation of peanut skins. Peanut skins were obtained by a blanching method, which involves immersing peanuts in boiling water for 5 minutes. After the water was drained and the peanuts cooled to room temperature, the skin was peeled by hand. After drying, 1 gram of peanut skin was mixed with 8 grams of a carbonization catalyst, $FeCl_3$, in 50 mL of deionized water. $FeCl_3$ was employed as a carbonization catalyst. The resulting mixture was evaporated at 80° C. under stirring, and then dried at 90° C. to yield a peanut skin/$FeCl_3$ precursor, which was subsequently carbonized under argon at 800° C. for 1 h, at a heating rate of 5° C. min$^{-1}$ to reach the temperature. As stated before, the resulting peanut skin derived carbon nanosheets is labeled as SCN.

In a parallel process, peanut skins were obtained by the blanching method, as described above. 1 gram of peanut skin and 8 grams of $FeCl_3$ were mixed in a 50 mL of deionized water followed by evaporation of water and drying at 90° C. to yield a peanut skin/$FeCl_3$ precursor. 0.5 g of KOH was mixed with the peanut skin/$FeCl_3$ precursor. The resulting mixture was carbonized and activated (by KOH) simultaneously under argon at 800° C. for 1 h, at a heating rate of 5° C. min$^{-1}$ to reach the temperature. Following the activation, the specimens were thoroughly washed with a solution of HCl and distilled water. As the last step, the carbons were dried in an oven at 80° C. for 12 h. The KOH activation derived carbon nanosheets having a high levels of mesoporosity. Such carbon nanosheets are labeled as SCN-A.

II. Material Characterization

The morphology and microstructure of the samples was characterized by transmission electron microscopy (TEM, JEOL 2010) and scanning electron microscopy (SEM, Hitachi-S5500). The structure and phase composition were characterized by X-ray diffraction (XRD, Bruker AXS D8 Discover diffractometer with Cu Kα radiation), X-ray photoelectron spectroscopy (XPS, Axis Ultra spectrometer), and Raman spectroscopy (Thermo Nicolet Almega XR Raman Microscope). The porosity of the resultant samples was analyzed by nitrogen adsorption-desorption isotherms with Quantachrome Instruments (U.S.A) Autosorb-1 at −196° C. The pore size distributions were evaluated by a nonlocal density functional theory (DFT) method using nitrogen adsorption data and assuming slit-pore geometry.

III. Electrochemical Evaluation

For fabrication of working electrodes, 80 wt % of active material (SCN or SCN-A), 10 wt % Super P, and 10 wt % polyvinylidene fluoride in N-methyl-2-pyrrolidone were well mixed and then coated onto stainless steel spacers. After drying at 120° C. under vacuum, 2032 button cells were fabricated inside an Argon filled glovebox, employing a polyethene separator and 1.0 M $NaClO_4$ in 1:1 (volume ratio) ethylene carbonate:diethyl carbonate (EC/DEC) as an electrolyte.

For a half-cell testing, Na metal was employed as a counter electrode. Hybrid Na-ion capacitors (NIC) were likewise tested as coin cells, with cathodes and pre-activated anodes fabricated from identical SCN-A material. For pre-activation, a half cell was firstly built using the carbon as a working electrode, which was then charged-discharged for several cycles at 0.1 A g$^{-1}$. Then inside the glove box this half-cell was disassembled, and a NIC was assembled employing the now pre-activated anode and a pristine cathode. The anode to cathode mass ratio ranged from 1:1 to 1:4. In a half cell, the mass loading for SCN or SCN-A with carbon black and binder was about 1 mg cm$^{-2}$ in total. In a NIC, the loading of SCN-A with carbon black and binder was varied from 1 mg cm$^{-2}$ to 4 mg cm$^{-2}$, while the area of the cathode and the anode is the same.

All the electrochemical tests were carried out at room temperature. Cyclic voltammetry (CV) and electrical impedance spectroscopy (EIS) analysis were conducted using a Solartron 1470E Multichannel Potentiostat/Cell Test System. Galvanostatic charge-discharge measurements were carried out using a BT2000 Arbin electrochemical workstation. For the NIC device the energy density (E) and power density (P) were calculated based on the following equations: $E=P\times t$, $P=V_{ave}\times I/m$, wherein t is the discharge time, I is the discharge current, and m is the mass of the active materials in both electrodes. The energy density of a device is its capacity multiplied by the average voltage during discharge, i.e. $V_{ave}$. For an ideal supercapacitor, conventional or hybrid, the voltage slopes monotonically with capacity. In that case $V_{ave}=(V_{max}+V_{min})/2$, wherein $V_{max}$ is the voltage at the beginning of discharge after the IR drop, and $V_{min}$ is the voltage at the end of discharge. Since the anode is pre-activated prior to NIC assembly, its initial coulombic efficiency in a half cell does not affect the energy density of the device.

IV. Electrochemical Performance as Anodes in a Half-Cell

Figure 6A:
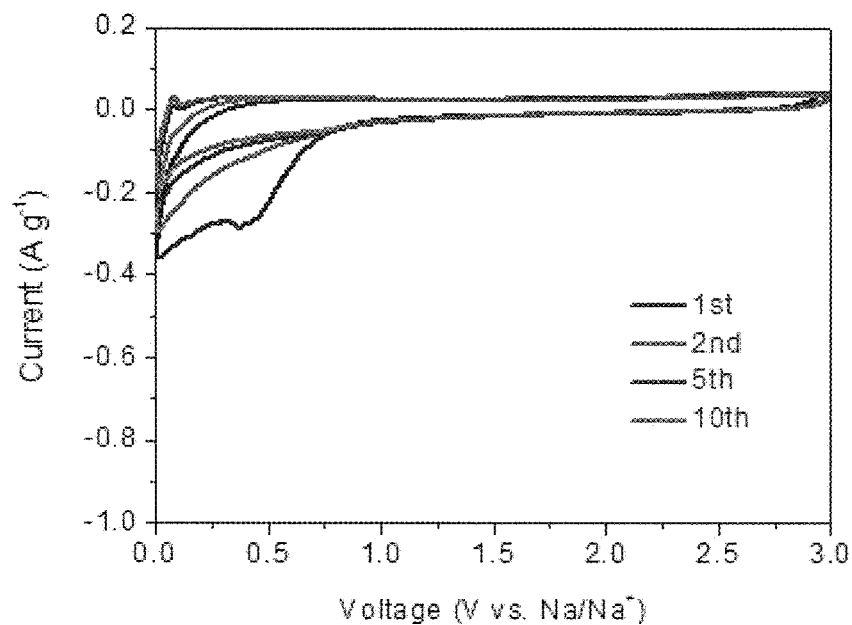
FIGS. 6A and 6B show representative CV curves of SCN and SCN-A electrodes according to some embodiments of the present invention between 0.01 and 3.0 V vs. Na/Na$^+$ at 0.01 mVs$^{-1}$.
Figure 6B:
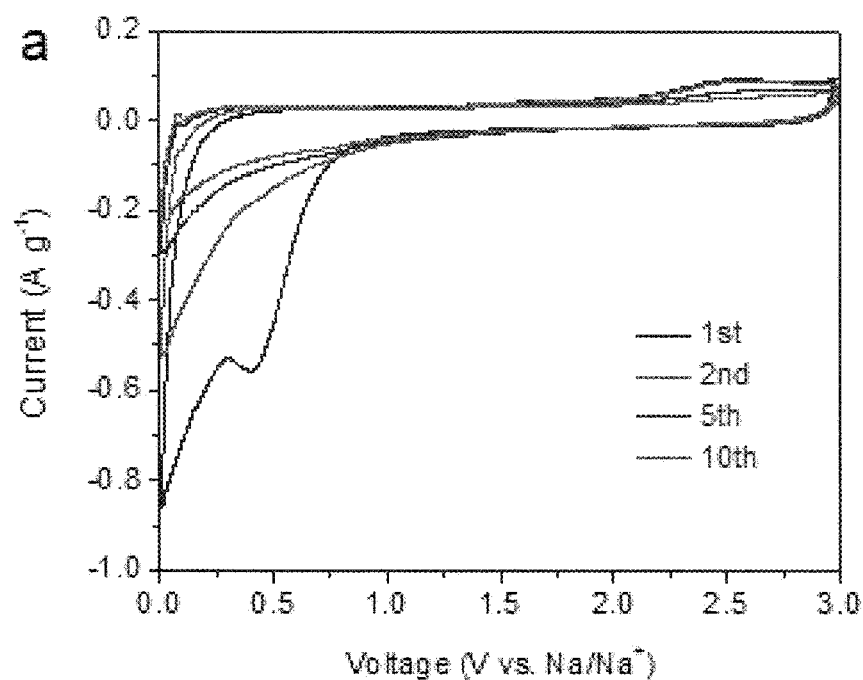

Cyclic voltammetry and galvanostatic discharge/charge cycling was performed on both the SCN and SCN-A electrodes, testing in the range of 0.01-3.0 V against Na metal counter electrode. FIGS. 6A and 6B show representative CV curves for SCN and SCN-A. In the first CV scan, the reduction peak at ~0.40 V during the cathodic process is generally ascribed to the electrolyte decomposition and the formation of a solid electrolyte interphase (SEI) layer. This peak disappears during the subsequent cycles. In addition, there is a small reversible reduction peak near 0 V and a counterpart oxidation peak at ~0.08 V. This pair may be attributed to the insertion/extraction of sodium ions into the defective graphene interlayers. The total current associated with these peaks is quite low, indicating that they constitute only a minor portion of the total reversible capacity. This is expected as the carbons are substantially more disordered and possess a mean graphene interlayer spacing that is ~10% rather than >20% dilated.

Figure 7A:
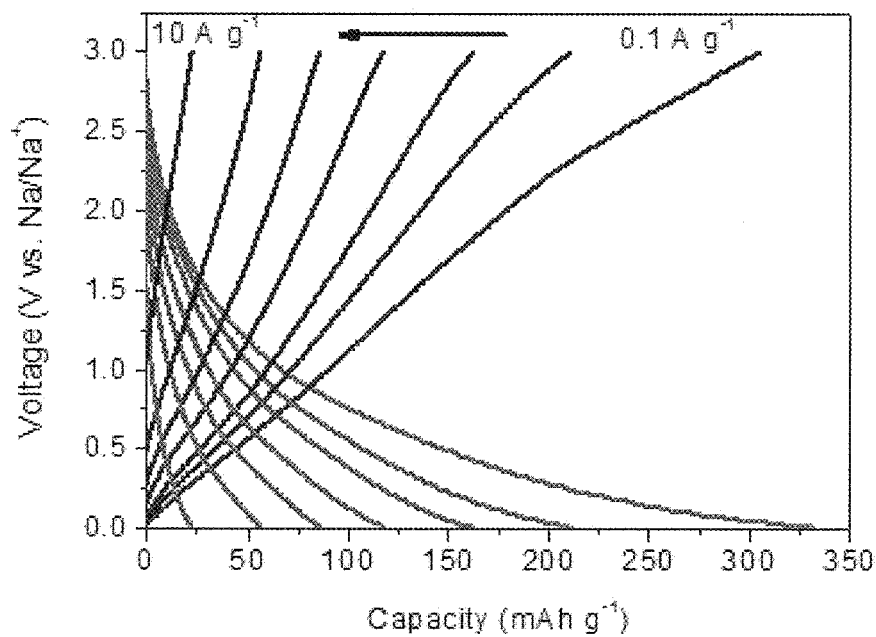
FIGS. 7A and 7B show representative charge-discharge profiles of SCN and SCN-A electrodes according to some embodiments of the present invention in every fifth cycle between 0.01 and 3.0 V versus Na/Na$^+$ at various current densities.
Figure 7B:
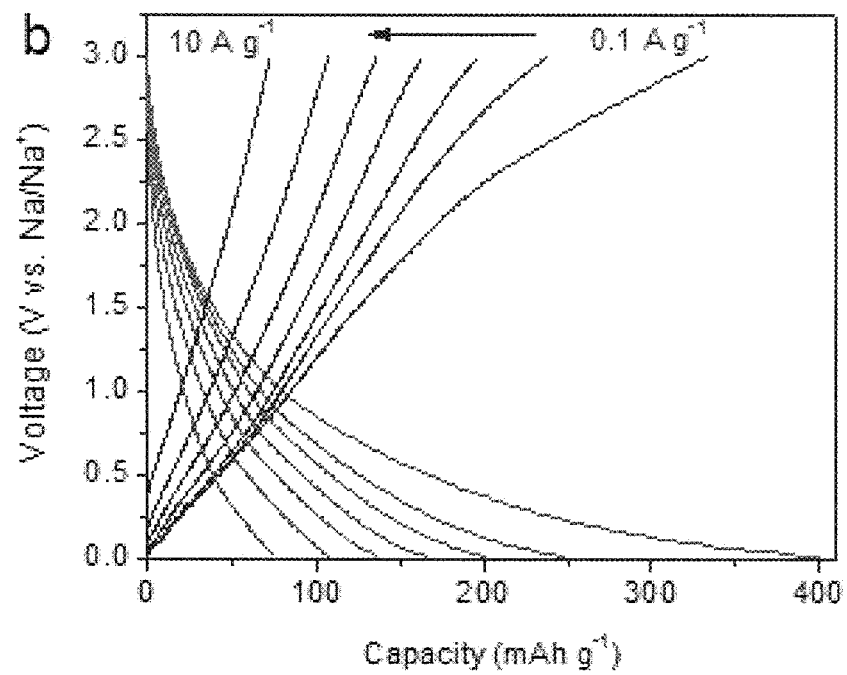
Figure 8:
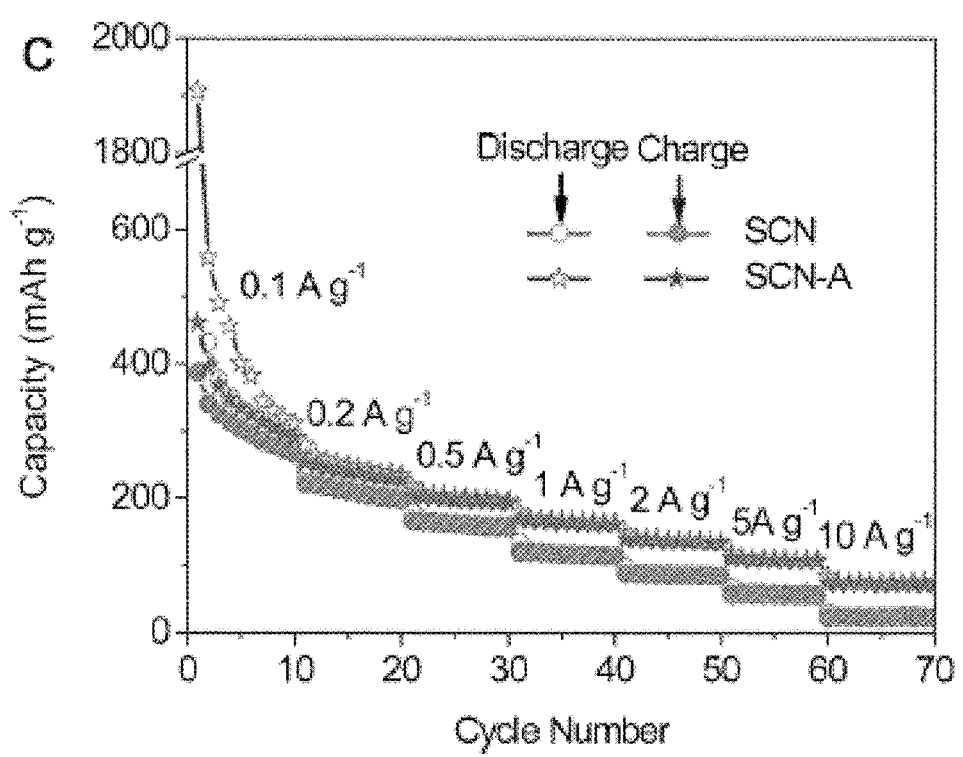
FIG. 8 shows rate performances of SCN and SCN-A electrodes according to some embodiments of the present invention at various currents.

FIGS. 7A and 7B show the representative charge-discharge profiles for SCN-A and SCN electrodes at various current densities. At a current density of 0.1 A g$^{-1}$, the cycle 1 reversible capacities for SCN and SCN-A were 386 mAh g$^{-1}$ and 461 mAh g$^{-1}$, respectably. The reversible capacity value of 461 mAh g$^{-1}$ is among the highest reversible capacities reported for carbon-based NIB anodes. It is generally understood that high surface area carbons lead to a large irreversible capacity loss of a solid electrolyte interphase (SEI) layer. This explains the lower cycle 1 coulombic efficiency (OE) of SCN and SCN-A, being 29.6% and 24.2%, respectively. A comparison of rate capability in FIG. 8 highlights the role of enhanced mesoporosity. The SCN electrode delivered reversible capacities of 162, 117, 86, 57, and 23 mAh g$^{-1}$ at the current densities of 0.5, 1, 2, 5, and 10 A g$^{-1}$, respectively. The more mesoporous SCN-A specimen provides capacities of 198, 164, 136, 108, and 73 mAh g$^{-1}$ at 0.5, 1, 2, 5, and 10 A g$^{-1}$. This rate performance is among the most favorable reported.

Figure 9:
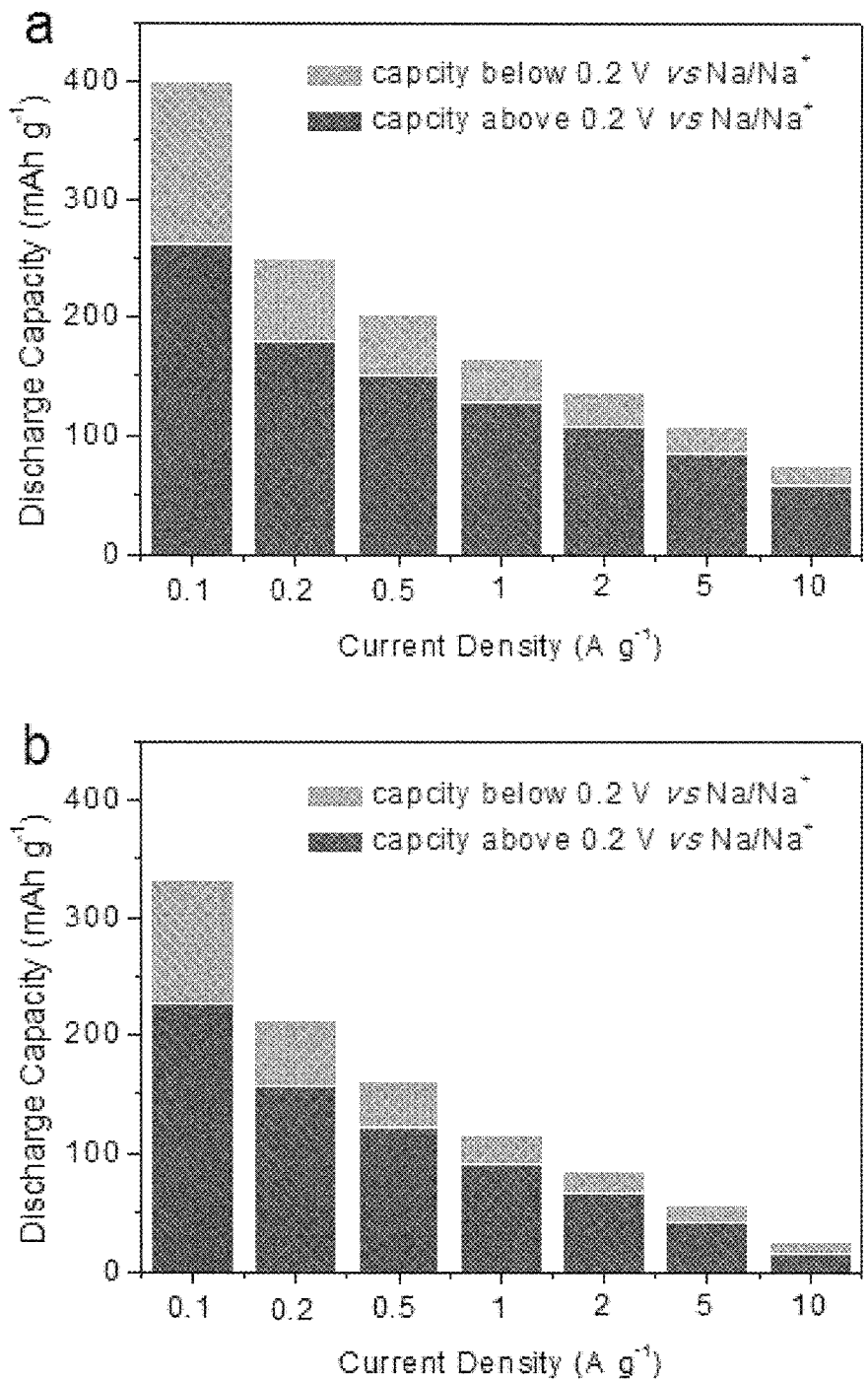
FIG. 9 shows a summary of capacity for SCN and SCN-A electrodes according to some embodiments of the present invention at above and below 0.2 V.

FIG. 9 shows bar charts for the reversible capacity above and below 0.2 V for both the SCN-A and SCN specimens. In both cases, and at all rates, the majority of the capacity is above 0.2 V. The Na charge storage mechanisms in defective and heteroatom-rich carbons are ascribed to the reversible chemisorption at heteroatom functional groups and at graphene defect sites such as Stone-Wales and divacancies. These mechanisms operate through a range of voltages (due to a distribution of binding energies), although being primarily active at above 0.1 V vs. Na/Na$^+$. Nanopore Na metal filling, which is expected to be active at low voltages (e.g. 0.1 V vs. Na/Na) is either absent entirely or is a minor contributor. Likewise, graphene interlayer intercalation, which also a primarily low voltage process, should be minor contributor as discussed already. The reason for the exceptional reversible capacity in SCN-A and SCN may be the combination of the high structural and heteroatom defect content and highly facile ion diffusion through both the electrolyte filled pores and in the solid state where the effective ~20 nm sheet thickness is further reduced by the copious nanopores. Porous carbons with less binding sites simply cannot hold as much sodium, while highly defective carbons with lower porosity levels become kinetically limited.

Figure 10:
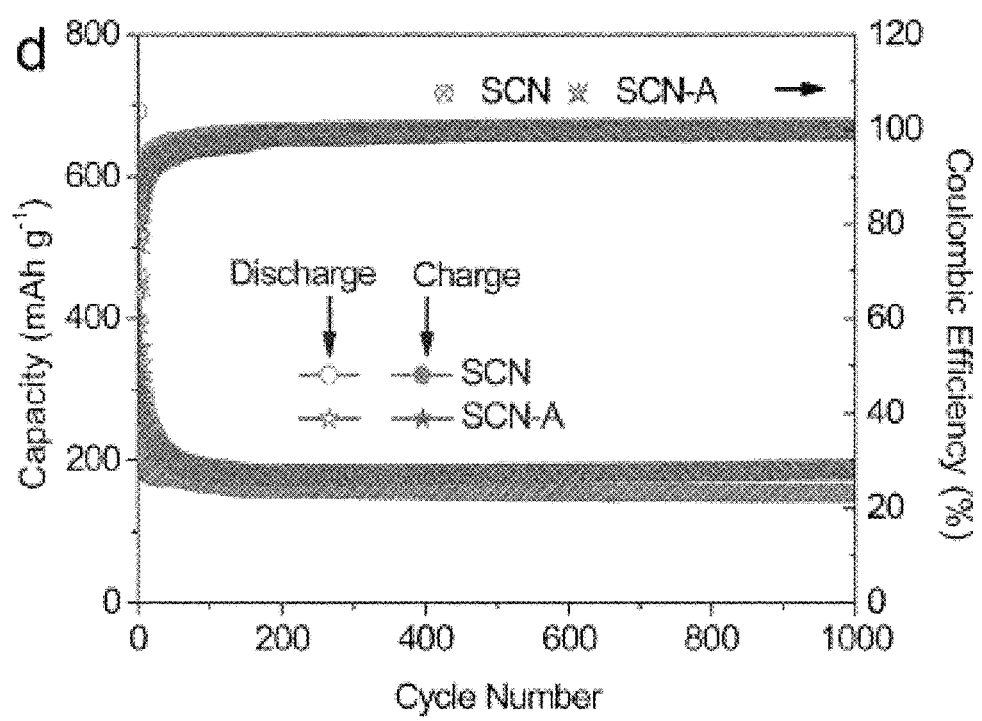
FIG. 10 shows extended cycling performances with related coulombic efficiency of SCN-A and SCN electrodes according to some embodiments of the present invention at 0.5 A g$^{-1}$.

FIG. 10 compares the cycling performance of the SCN-A and SCN electrodes, tested at 500 mA g$^{-1}$ for up to 1000 cycles. The CE increases dramatically upon cycling, reaching over 90% after 10 cycles, 95% after 50 cycles and close to 99-100% after 200 cycles. The specific capacity showed a decrease for the initial 100 cycles, going from 225/399 mAh g$^{-1}$ at cycle 1 to 169/188 mAh g$^{-1}$ at cycle 100. The capacity decrease during early cycling may be related with the irreversible trapping of Na at the exceptionally high binding energy heteroatom and graphene defect sites. The SCN and SCN-A electrodes retain a reversible capacity of 154 and 185 mAh g$^{-1}$ even after 1000 cycles.

V. Electrochemical Performance as Cathodes in a Half-Cell

Figure 11A:
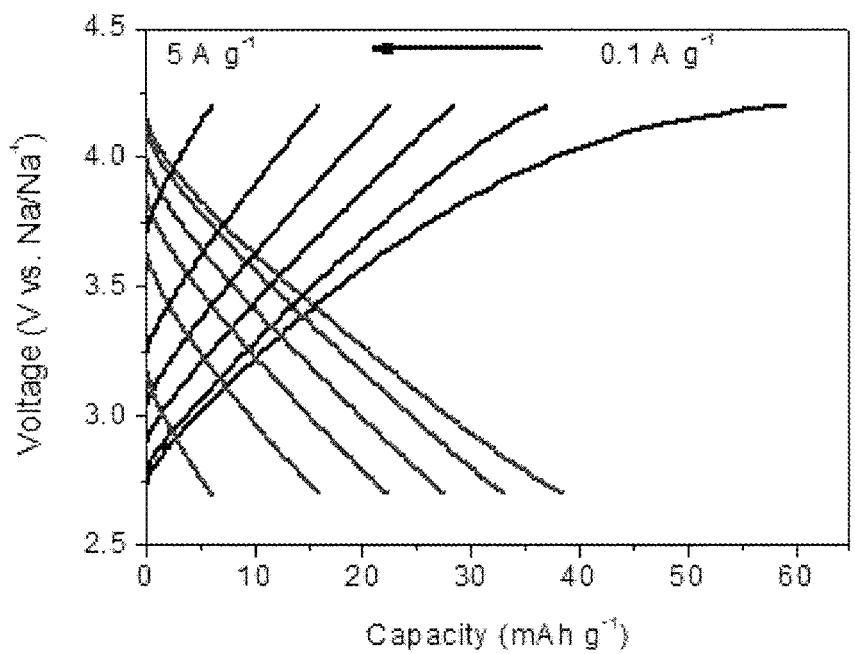
FIGS. 11A and 11B show charge and discharge curves of SCN and SCN-A according to some embodiments of the present invention at various current densities, tested between 2.7 and 4.2 V versus Na/Na$^+$.
Figure 11B:
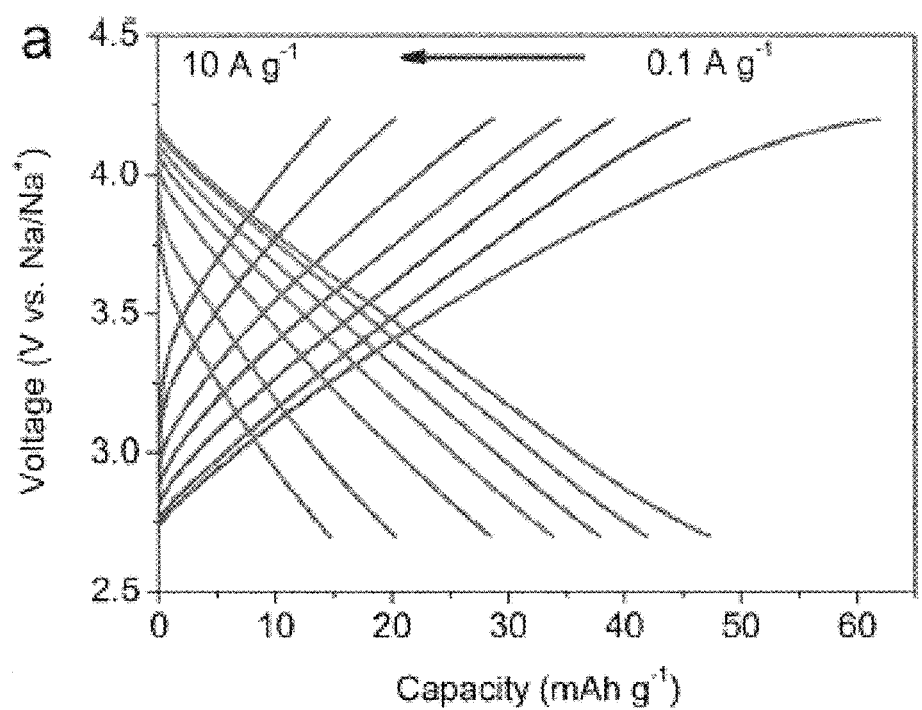
Figure 12:
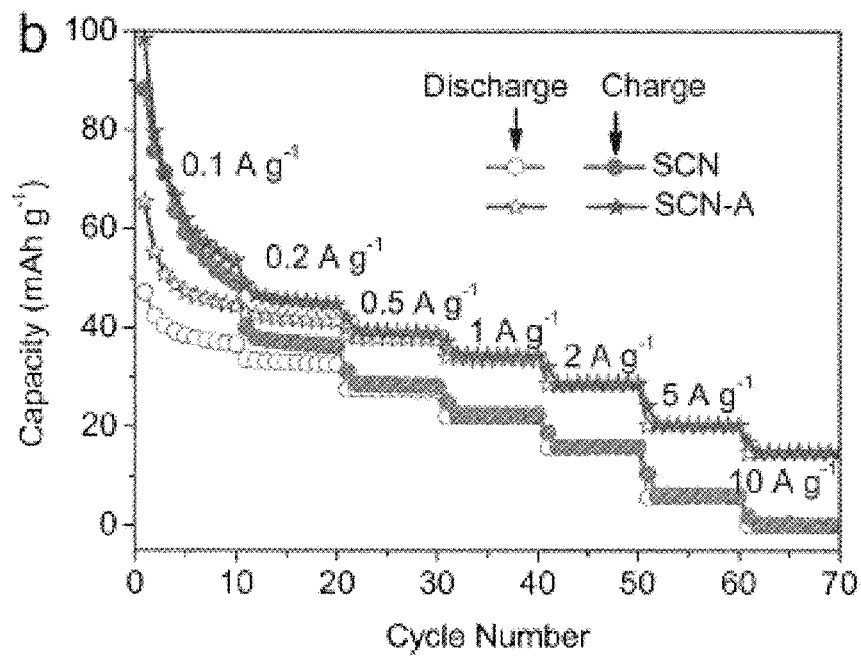
FIG. 12 shows that rate performances of SCN and SCN-A electrodes according to some embodiments of the present invention between 2.7 and 4.2 V.
Figure 13:
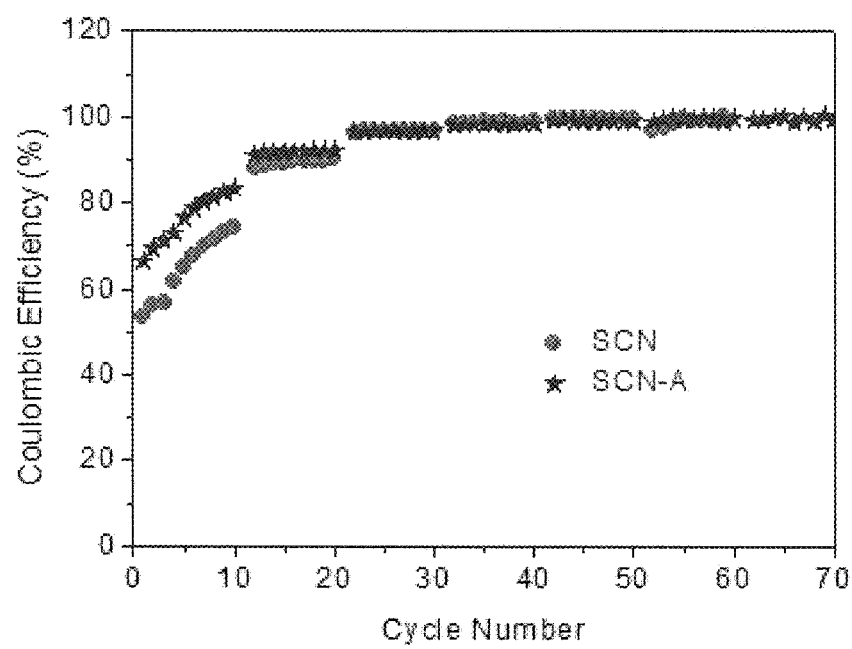
FIG. 13 shows coulombic efficiencies of SCN and SCN-A cathodes according to some embodiments of the present invention during the rate capability measurements of FIGS. 11A and 11B.

SCN and SCN-A may also be employed as ion adsorption electrodes operated at high potentials, i.e. a cathode. In some embodiments, capacity is mainly achieved both by electrical double layer storage of $ClO_4^-$, and/or through reversible adsorption interaction of Na$^+$ at surface defects and oxygen functionalities. It is not expected that bulk intercalation processes will be significant at the high voltages employed. The half cells constructed with SCN-A and SCN electrodes may be cycled between 2.7 and 4.2 V vs. Na/Na$^+$, as shown in at various current densities and the rate-dependent capacities are illustrated in FIGS. 11A and 11B. FIG. 12 shows that SCN-A possesses superior reversible capacity at every rate tested, with the difference between SCN-A and SCN electrodes increasing at higher rates. This is attributed to a higher surface area and superior pore size distribution, analogous to the low voltage results shown earlier. According to the Raman spectroscopy, the SCN-A electrode is more disordered, which means there are in general more defects available for ion adsorption. FIG. 13 shows coulombic efficiency of SCN and SCN-A cathodes during the rate capability measurements of FIGS. 11A and 11B. FIG. 13 indicates that SCN and SCN-A cathodes have the typical voltage-capacity profiles of capacitors, and that the coulombic efficiency approaches 99% during steady state cycling.

VI. Hybrid Sodium Ion Capacitors Based on SCN-A Electrodes

According to further embodiments, SCN-A is used as both the cathode and the anode in a MO device. Such NIC device may be described as a SCN-A//SCN-A hybrid Na-ion capacitor. The electrode mass ratio is optimized so as to balance the capacities and achieve targeted voltage swings for each electrode. As the specific capacity of SCN-A which operates as a cathode is substantially lower than when it is operates as an anode, the anode to cathode mass ratio of the active materials is varied from 1:1 to 1:4. FIGS. 14 to 19 show the electrochemical performances of SCN-A//SCN-A hybrid Na-ion capacitors in the potential range of 0-4.0 V, employing the differing mass ratios.

Figure 14:
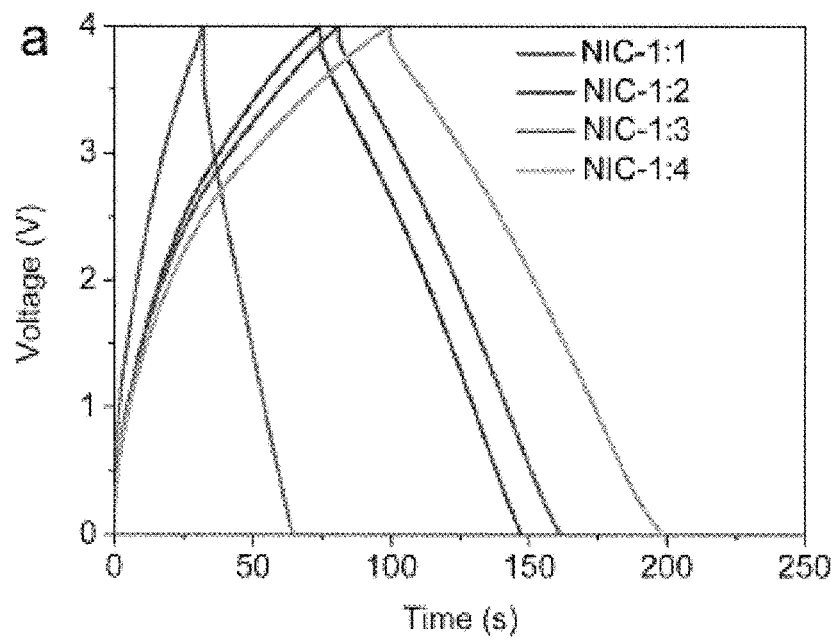
FIG. 14 shows Galvanostatic charge-discharge profiles of SCN-A/SCN-A NICs (sodium ion capacitors) according to some embodiments of the present invention with different anode to cathode mass ratios, tested at 5 A g$^{-1}$.
Figure 15:
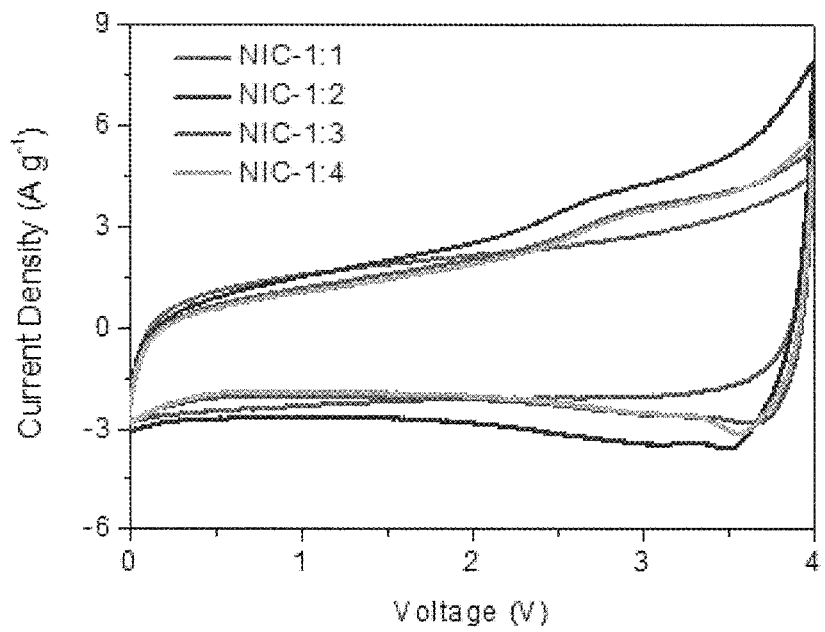
FIG. 15 shows CV curves of SCN-A/SCN-A NIC devices according to some embodiments of the present invention with different cathode to anode mass ratios, tested at 20 mV s$^{-1}$.

FIG. 14 shows that the slopes of the device charge-discharge curves are not strictly linear. This is due to the multiple energy-storage mechanisms in the anodes and the associated shape of the charge-discharge curves that do not decrease/increase monotonically. FIG. 15 displays the CV curves of the NIC devices with various mass loadings, tested at 20 mV s$^{-1}$. As may be seen, all NIC devices exhibit a deviation from an ideal "capacitor-like" rectangular shape for the same reason as discussed previously.

Figure 16:
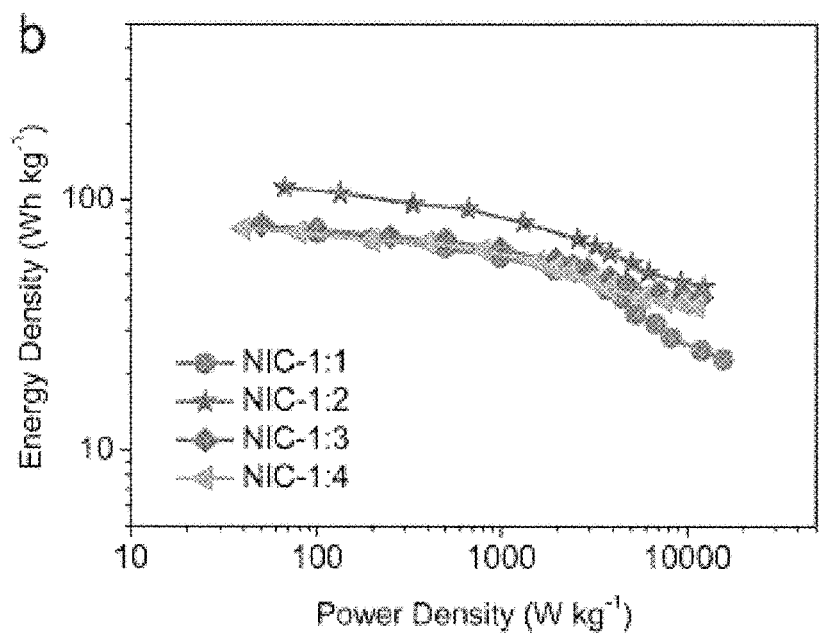
FIG. 16 shows active mass normalized Ragone plots of the SCN-A//SCN-A NICs according to some embodiments of the present invention.

The Ragone plots of the SCN-A//SCN-A NICs are shown in FIG. 16. The active mass normalized specific energy of the hybrid cell (anode to cathode mass ratio 1:2) ranges from 112 to 45 Wh kg$^{-1}$, while the corresponding specific power is in the range of 67 to 12000 W kg$^{-1}$. It is worth noting that the hybrid device could finish charge/discharge within 20 s, with a high energy density of 47 Wh kg$^{-1}$ still achieved.

Figure 17:
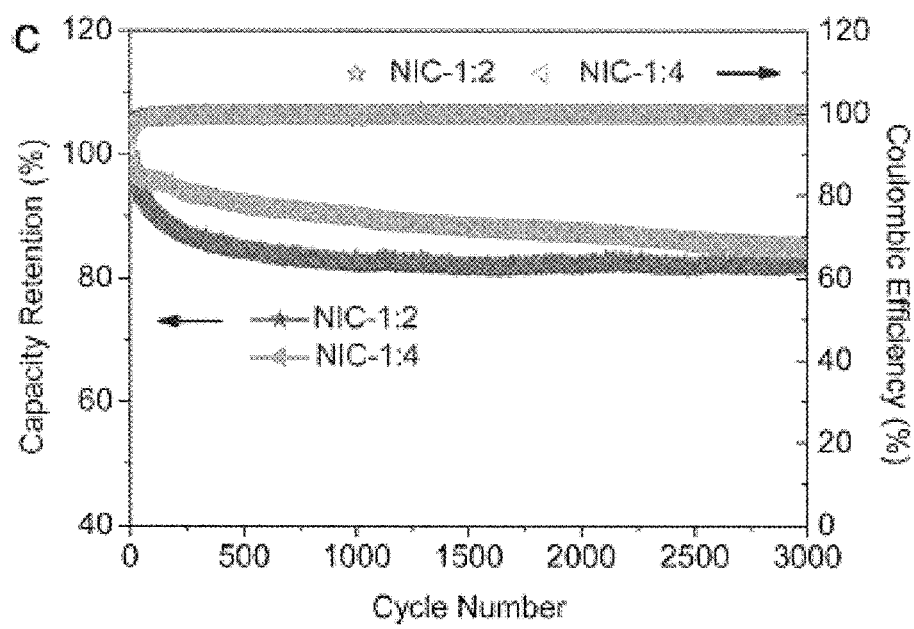
FIG. 17 shows that cycling performance of the NICs according to some embodiments of the present invention with anode to cathode mass ratios of 1:2 and 1:4, tested at 5 A g$^{-1}$.
Figure 18:
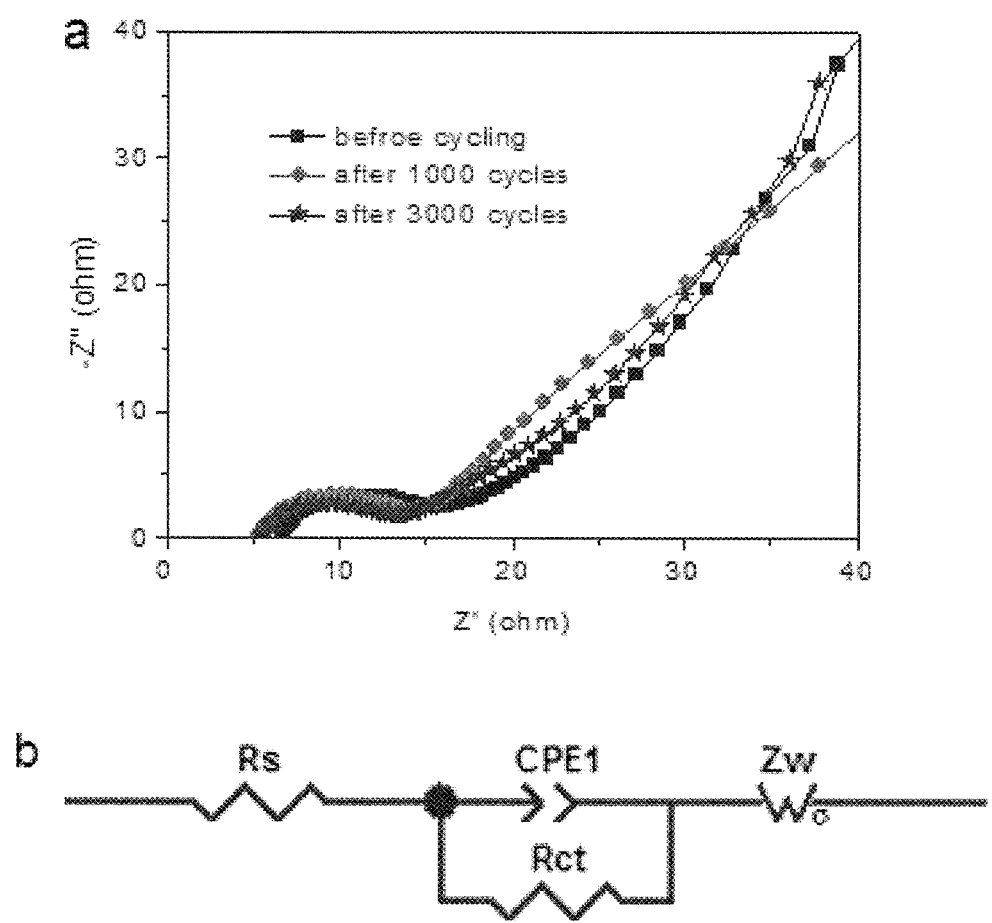
FIG. 18 shows (a) Nyquist plots of the NICs according to some embodiments of the present invention with an anode to anode mass ratio of 1:2 before test, after 1,000 cycles, and after 3,000 cycles; (b) equivalent circuit used for fitting the experimental data.

FIG. 17 shows that the NIC with an anode to cathode mass ratio of 1:2 exhibits good cycling stability, with a capacity retention of 83% after 1000 cycles and 82% after 3000 cycles. The NIC with an anode to cathode mass ratio of 1:4 exhibited slightly improved cyclability, with a capacity retention of 90% after 1000 cycles and 85% after 3000 cycles. FIG. 17 also shows that during steady-state cycling the coulombic efficiency of the NICs is in the range of 99%-100%.

Electrochemical impedance (EIS) spectra of the NIC with an anode to cathode mass ratio of 1:2 are measured prior to cycling, after 1000 cycles, and after 3000 cycles. The spectra are fit using an equivalent circuit model shown in FIG. 18. The equivalent circuit used for fitting the experimental data includes the high frequency intercept with the x-axis $R_s$, which is the total resistance of electrolyte, electrode, current collector and separator. The diameter of the depressed semicircle (at high- and middle-frequency) $R_{ct}$ is the charge transfer resistance, which is attributed to both the SEI and the electrolyte interface. $Z_w$ is the Warburg impedance related to the diffusion limitations of the Na ions. The charge-transfer resistances obtained from the simulated equivalent circuits are 6.1 and 4.9Ω before cycling and after 3000 cycles, which indicates a stable solid-electrolyte interface.

Figure 19:
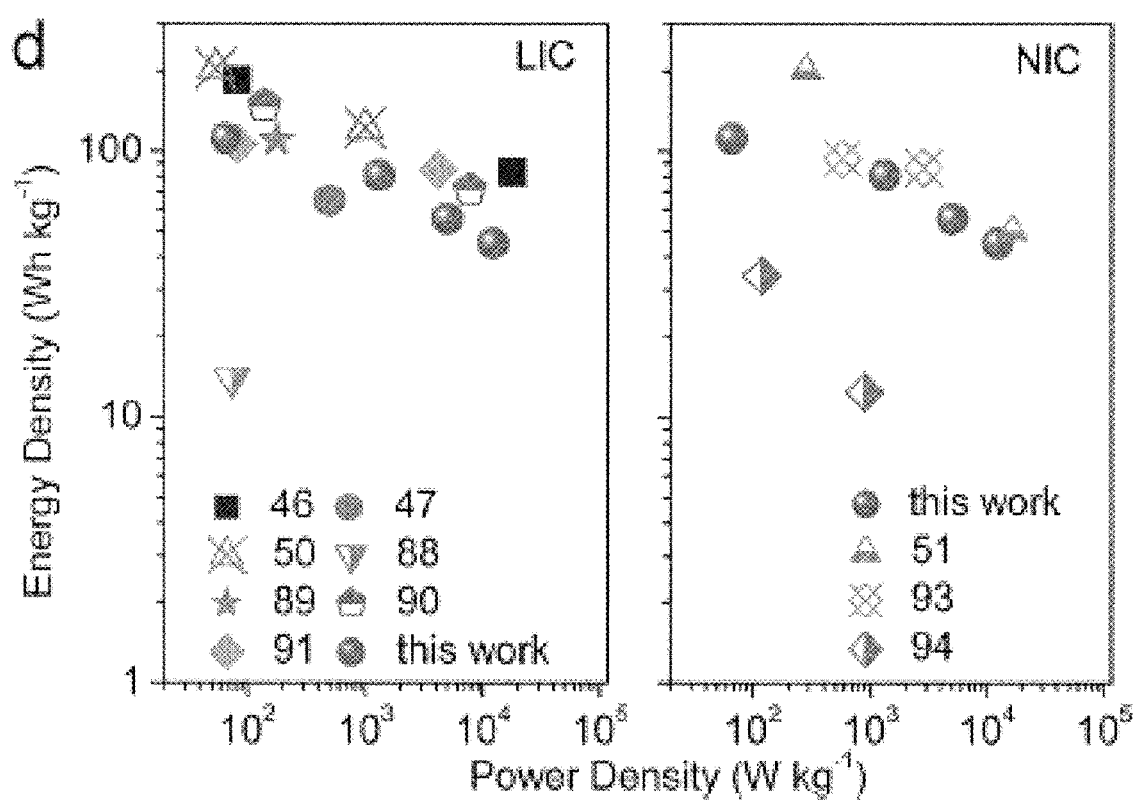
FIG. 19 shows a comparison of the energy—power characteristics of the NICs according to some embodiments of the present invention versus state-of-art lithium ion capacitors (LIC, left panel) and sodium ion capacitors (NICs, right panel) from literature.

FIG. 19 shows a comparison of the energy—power characteristics of the NICs of the present invention versus state-of-art lithium ion capacitors (LIC, left panel) and sodium ion capacitors (NICs, right panel) from literature. All the LIC devices disclosed in the literature are asymmetrical systems (different materials for anode versus cathode) and represent state-of-the-art performance in each class. A diverse range of material combinations may be employed for LICs, for example, MnO-2D carbon anode vs. 2D carbon cathode, MOF-derived crumpled-sheet-assembled perforated carbon cuboids cathode vs. $Li_4Ti_5O_{12}$ anode, iron oxide—graphene anode vs. high surface area three-dimensional porous carbon material (3D Graphene) cathode, activated carbon cathode vs. carbon coated nano-$LiTi_2(PO_4)_3$ anode, a tubular mesoporous carbon cathode vs. $SnO_2$—C hybrid anode, graphene—cathode and graphene—oxide anode, and urea-reduced graphene oxide cathode vs. prelithiated graphite anode. The NIC field is more recent and contains fewer examples of complete devices. The NIC devices disclosed in the literature are also based on asymmetrical systems, e.g., adsorption high surface area carbon cathode vs. Na intercalation pseudographitic carbon anode, activated carbon as a cathode vs. hard carbon as the anode, an activated carbon cathode vs. graphitic mesocarbon microbead anode, and porous carbon as a cathode vs. sodium titanate nanotubes as the anode. As may be seen from FIG. 19, all these systems offer excellent performance. However, the NIC device of the present invention, which employs an identical nanostructured carbon for both the cathode and the anode, is most competitive among the Li and the Na systems because of its overall simplicity, environmental friendliness, and potential for low cost manufacturing of a device with identical waste-derived materials powering both electrodes.

Although specific embodiments have been disclosed herein, they should be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A carbon nanosheet suitable for using as an electrode, comprising:
    at least one amorphous site, at least one crystalline site, or a combination thereof; and
    said carbon nanosheet having an overall structure which is disordered;
    said carbon nanosheet configured to reversibly store ions by reversible adsorption at the at least one amorphous site;
    wherein said carbon nanosheet has an average thickness of at least 4 nm, and the thickness of the carbon nanosheet varies across its cross section, and
    wherein a largest thickness of the carbon nanosheet is at least two times of a smallest thickness of the same carbon nanosheet.

2. The carbon nanosheet of claim 1,
    wherein the carbon nanosheet comprises graphene planes, and
    wherein the graphene planes are not ordered, and
    wherein the carbon nanosheet is configured to reversibly store ions by reversible intercalation between the graphene planes.

3. The carbon nanosheet of claim 1,
    wherein the carbon nanosheet comprises graphene planes, and
    wherein the graphene plane have defects, and
    wherein the carbon nanosheet is configured to reversibly store ions by reversible adsorption at the graphene defects.

4. The carbon nanosheet of claim 1,
    wherein the carbon nanosheet has an average thickness of greater than 20 nm.

5. The carbon nanosheet of claim 1,
    comprising nanometer scale surface troughs for electrolyte storage.

6. The carbon nanosheet of claim 1,
    wherein the carbon nanosheet is at least 50% mesoporous.

7. The carbon nanosheets of claim 1,
    wherein the carbon nanosheet comprises a microporosity of a pore size in a range of 0.1 nm to 2 nm, a mesoporosity of a pore size in a range of 2 nm to 50 nm, and a macroporosity of a pore size in a range of 50 nm to 1 mm.

8. The carbon nanosheets of claim 1,
    wherein the carbon nanosheet comprises at least 10 wt % of oxygen moieties, and
    wherein the carbon nanosheet is configured to reversibly store ions by reversible binding at the oxygen moieties.

9. The carbon nanosheet of claim 1,
    wherein a plurality of nitrogen, sulfur, and/or other heteroatoms are disposed on surfaces of the carbon nanosheet.

10. The carbon nanosheet of claim 1,
    wherein the carbon nanosheet comprises an iron oxide disposed on surfaces of and/or embedded inside the carbon nanosheet.

11. The carbon nanosheet of claim 1,
    wherein the carbon nanosheet is prepared from a natural biological precursor or from a synthetic precursor.

12. A positive electrode of an ion energy storage device, comprising:
    a plurality of the carbon nanosheets of claim 1.

13. A negative electrode of an ion energy storage device, comprising:
    a plurality of the carbon nanosheets of claim 1.

14. An energy storage device, comprising:
    a first electrode;
    a second electrode;
    a plurality of carbon nanosheets in each of said first and second electrodes,
    each of said plurality of carbon nanosheets in each of said first and second electrodes having at least one amorphous site, at least one crystalline site, or a combination thereof;
    each of said plurality of carbon nanosheets having an average thickness of at least 4 nm, and the thickness of each of the carbon nanosheets varies across its cross section and a largest thickness of the carbon nanosheet is at least two times of a smallest thickness of the same carbon nanosheet,
    wherein an overall structure of each of the plurality of carbon nanosheets is disordered, and
    wherein the energy storage device is configured to reversibly store ions by reversible adsorption at the at least one amorphous site.

15. The energy storage device of claim 14,
    wherein said plurality of carbon nanosheets are disconnected with each other.

16. The energy storage device of claim 14,
    wherein the plurality of carbon nanosheets are primary phases of the two electrodes.

17. The energy storage device of claim 14,
    wherein the plurality of carbon nanosheets are secondary phases of the two electrodes.

18. The energy storage device of claim 14,
    wherein iron oxides are embedded inside the plurality of carbon nanosheets.

19. The energy storage device of claim 14,
    wherein the electrical energy storage device employs only ions in the two electrodes and/or a metal source added to one or both of the first and the second electrodes.

20. The energy storage device of claim 14,
    wherein at least one of the plurality of carbon nanosheets comprise at least 10 wt. % of oxygen moieties disposed on their surfaces, and
    wherein the energy storage device is configured to store ions by reversible binding at the oxygen moieties.

21. The energy storage device of claim 14,
    wherein a plurality of O, N, B, S, and/or P functional groups are disposed on surfaces of at least one of the plurality of carbon nanosheets, and
    wherein the energy storage device is configured to store ions by reversible ion adsorption at the O, N, B, S, and/or P functional groups.

22. The energy storage device of claim 14,
wherein each of the plurality of carbon nanosheets comprise:
graphene planes being not ordered, each graphene plane having defects,
at least 50% mesoporisity, and
nanometer scale surface troughs for electrolyte storage,
wherein the energy storage device is configured to reversibly store charge by reversible ion adsorption at the graphene planes with defects, the mesopores, and the nanometer scale surface troughs.

23. An energy storage device, comprising:
an anode;
a cathode,
at least one of said anode and said cathode comprising a plurality of carbon nanosheets;
each of the carbon nanosheets comprising at least one amorphous site, at least one crystalline site, or a combination thereof; and
wherein an overall structure of each of the carbon nanosheets is disordered,
wherein each of the carbon nanosheets is not connected to another carbon nanosheet and the thickness of each of the carbon nanosheets varies across its cross section such that a largest thickness of each of the carbon nanosheets is at least two times of a smallest thickness of the same carbon nanosheet.

24. The energy storage device according to claim 23, said energy storage device being a hybrid battery and supercapacitor.

25. The energy storage device of claim 23,
wherein the carbon nanosheets are employed as the anode, and
wherein the cathode is a lithium iron phosphate (LFP), a nickel cobalt aluminum (NCA), a nickel manganese cobalt (NMC) cathode, a lithium cobalt oxide (LCO) cathode, or a ceramic positive electrode.

26. The energy storage device of claim 23,
wherein the carbon nanosheets are employed as the cathode, and
wherein the anode is an oxide-based anode, a lithiated Sn anode, a lithium metal anode, a sulfur-based anode, a selenium anode, a graphite anode, an activated carbon anode, a graphene anode, a Si anode, a Sn anode, an alloy anode, an oxides anode, a sulfides anode, a nitrides anode, or another negative electrode.

27. The energy storage device of claim 23,
wherein the carbon nanosheets are employed as both the anode and the cathode.

28. The energy storage device of claim 27,
wherein a mass ratio of the carbon nanosheets as the anode verses the carbon nanosheets on as the cathode is from 1:1 to 1:4.

29. A supercapattery, comprising:
a housing, the housing comprising dimensions that conform to standardized battery dimensions; and
a capacitor cell, the cell disposed in the housing and electrically coupled to the housing,
wherein the capacitor cell comprises:
a positive electrode and a negative electrode,
wherein a plurality of carbon nanosheets is employed as a positive electrode and a negative electrode, or both,
wherein each of the plurality of carbon nanosheets comprise at least one amorphous site, at least one crystalline site, or a combination thereof,
wherein an overall structure of each of the plurality of carbon nanosheets is disordered, and each carbon nanosheet has an average thickness of at least 4 nm, and the thickness of each carbon nanosheet varies across its cross section, and
wherein a largest thickness of each carbon nanosheet is at least two times of a smallest thickness of the same carbon nanosheet.

30. The supercapattery of claim 29,
wherein the housing comprises a form factor of a D-cell sized battery, a C-cell sized battery, an AA-cell sized battery, an AAA-cell sized battery, a 18650 lithium ion battery, or a 26650 lithium ion battery.

31. The supercapattery of claim 29,
wherein the positive electrode and the negative electrode are in the form of elongated pieces,
wherein the positive electrode and the negative electrode are disposed on two opposite surfaces of an elongated insulator; and
wherein the positive electrode, the insulator, and the negative electrode are wind in a jelly roll configuration.

* * * * *